US012780571B2

(12) United States Patent
Mccafferty et al.

(10) Patent No.: US 12,780,571 B2
(45) Date of Patent: Nov. 3, 2026

(54) CASE UNSTACKER AND INVERTER

(71) Applicant: BURTOFT, LLC

(72) Inventors: Matthew Robert Mccafferty, Caldwell, ID (US); Jeremy P. House, Boise, ID (US)

(73) Assignee: BURTOFT, LLC, Caldwell, ID (US)

( * ) Notice: Subject to any disclaimer, the term of this patent is extended or adjusted under 35 U.S.C. 154(b) by 0 days.

(21) Appl. No.: 18/808,037

(22) Filed: Aug. 18, 2024

(65) Prior Publication Data

US 2025/0058981 A1 Feb. 20, 2025

Related U.S. Application Data

(60) Provisional application No. 63/533,252, filed on Aug. 17, 2023.

(51) Int. Cl.
*B65G 59/02* (2006.01)
*B65G 47/252* (2006.01)

(52) U.S. Cl.
CPC ........... *B65G 59/02* (2013.01); *B65G 47/252* (2013.01); *B65G 2203/0233* (2013.01)

(58) Field of Classification Search
CPC .................. B65G 59/02; B65G 47/252; B65G 2203/0233; B65G 59/08; B65G 65/00; B65G 2814/0317; B65G 65/23; B65G 59/026; B65G 35/06; B65G 47/1478; B65G 47/1492; B65G 49/085
USPC ................ 414/404, 408, 409, 422, 424, 413
See application file for complete search history.

(56) References Cited

U.S. PATENT DOCUMENTS 1,907,457 A * 5/1933 Stevenson .............. B65G 65/00 414/795.8
2,018,748 A * 10/1935 Thompson ............. B65G 65/00 414/413
2,258,461 A * 10/1941 Marsden ............. B65G 59/026 198/801
2,590,225 A * 3/1952 Bashore ................. B65G 59/08 198/624
2,619,238 A * 11/1952 Miller ..................... B65B 69/00 414/413
2,659,497 A * 11/1953 Verrinder .................. B66F 9/02 198/801
5,836,737 A * 11/1998 Hashimoto .......... B65G 59/026 414/796.4
9,242,662 B2 * 1/2016 Scott ......................... B62B 1/16
2010/0011954 A1 * 1/2010 Reininger ............... G01S 13/88 92/5 R (Continued)

*Primary Examiner* — Lynn E Schwenning
(74) *Attorney, Agent, or Firm* — Alexander Pokot; AP PATENTS

(57) ABSTRACT

An apparatus includes a guide with an inlet end, an outlet end and a hollow interior between inlet and outlet ends, the hollow interior sized and shaped to at least receive a stack of articles therewithin, and a device capable of conveying and advancing the stack within the hollow interior between ends of the guide. The guide may include at least one straight portion, at least one curved portion and a passageway or a hollow interior. The device may be provided with an actuator, a first component coupled to the actuator and adapted for a reciprocal movement along at least a portion of a length of the actuator, a second component, and a pivotal connection between the first component and the second component.

24 Claims, 30 Drawing Sheets

(56) References Cited

U.S. PATENT DOCUMENTS

2013/0092187 A1* 4/2013 Lim .......................... B08B 3/00
134/8

* cited by examiner

CASE UNSTACKER AND INVERTER

CROSS-REFERENCE TO RELATED APPLICATIONS

This nonprovisional application claims the benefit of priority, under 35 U.S.C. .sctn. 119(e), to a U.S. Provisional Patent Application Ser. No. 63/533,252 filed on Aug. 17, 2023 and titled "CASE UNSTACKER AND INVERTER", which is hereby incorporated by reference in its entirety.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

TECHNICAL FIELD

The subject matter relates to advancement of articles within a passageway. The subject matter may relate to lift articles in a vertical direction. The subject matter may relate to a case unstacker. The subject matter may relate to a case inverter. The subject matter may relate to an apparatus adapted to move a stack of cases and invert each case individually. The subject matter may relate to an apparatus adapted to move a stack of cases in a vertical direction and invert each case individually without use of a conveyor. The subject matter may relate to a case positioner for automatically inverting upended cases moving within a passageway. The subject matter may relate to an apparatus adapted to elevate articles without unstacking and/or inverting such articles.

BRIEF DESCRIPTION OF THE DRAWINGS

The accompanying drawings are incorporated in and constitute part of the specification and illustrate various embodiments. In the drawings.

DETAILED DESCRIPTION

Figure 1:
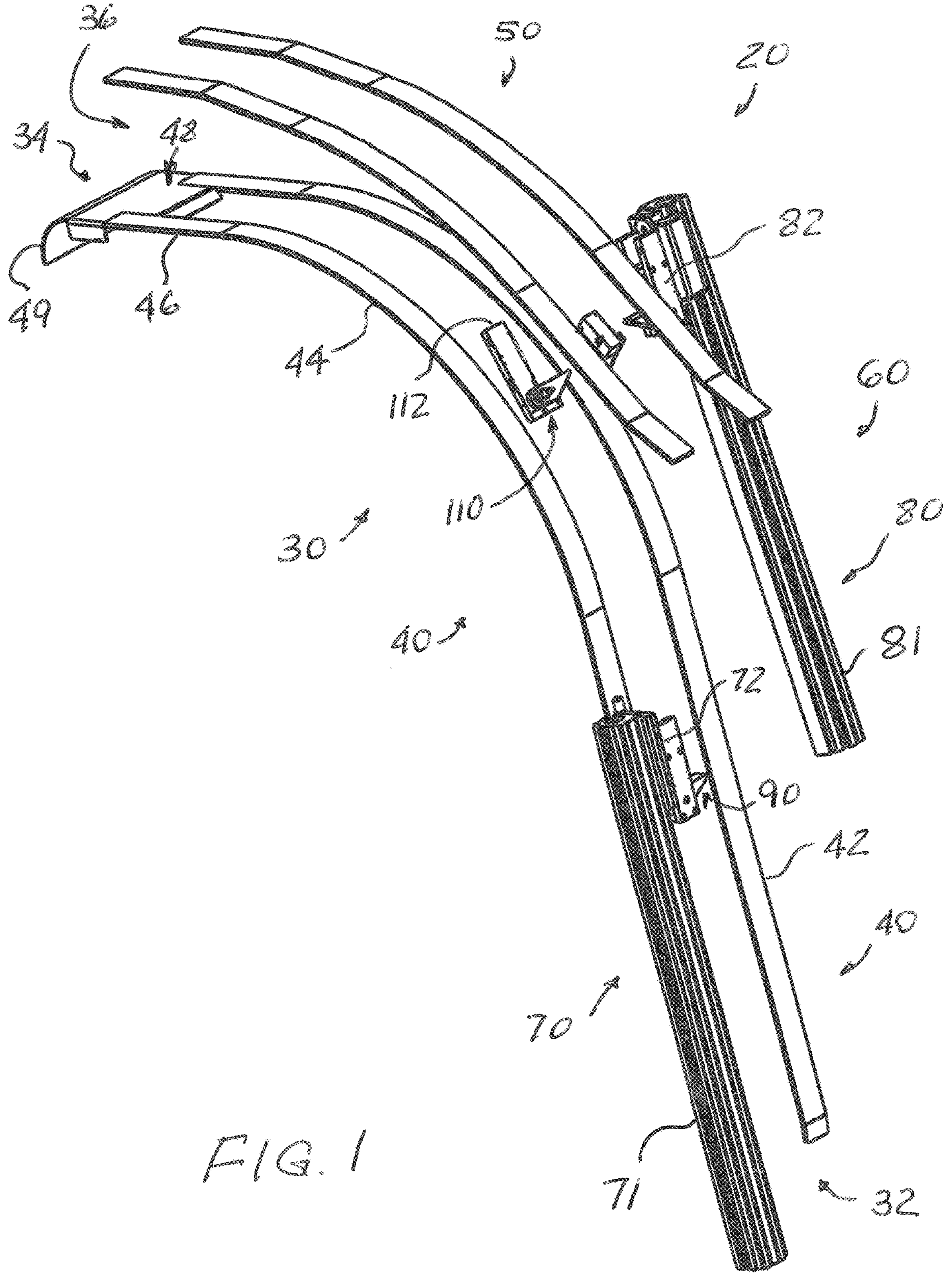
FIG. 1 illustrates a perspective view of a case unstacker and inverter.

Prior to proceeding to the more detailed description of the present subject matter, it should be noted that, for the sake of clarity and understanding, identical components which have identical functions have been identified with identical reference numerals throughout the several views illustrated in the drawing figures.

It is to be understood that the singular forms "a," "an," and "the" include plural referents unless the context clearly dictates otherwise or expressly specified otherwise. Thus, for example, reference to "a component surface" includes reference to one or more of such surfaces.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

The verb "may" is used to designate optionality/noncompulsoriness. In other words, something that "may" can, but need not.

Before elucidating the subject matter shown in the Figures, the present disclosure will be first described in general terms.

An apparatus may be adapted with a guide (structure) with a passageway to receive and contain a stack of articles and a device to move the stack of articles within the passageway along a direction from an inlet end toward a discharge (outlet) end of the apparatus and to further discharge articles through the discharge (outlet) end.

The article may be a case. The case may have a cuboid shape. The case may be designed with four side walls, a bottom wall and an open top. In other words, one wall of the cuboid case may be eliminated or removed to provide an open top. The case may be formed of plastic, wire or the like. The case may be provided in a 13"×13" size. The case may be provided in a 13"×16" size. The case may be provided in a 13"×19" size. The case may be provided in a different size depending on the application. The article may have a shape being other than the cuboid shape.

The cuboid case may be used to transport milk containers. The cuboid case may be used to transport juice containers. The cuboid case may be used to transport mined ore. The cuboid case may be used to transport trash. The cuboid case may be used to transport soil.

The article may be a film wrapped product. The article may be a bundled product. Wrapped or bundled product may be a plurality of pallets. Wrapped or bundled product may be a plurality of carts. Wrapped or bundled product may be a plurality of baking trays. Wrapped or bundled product may be a plurality of bread boxes. Wrapped or bundled product may be a stack of newspapers. Wrapped or bundled product may be a plurality of egg cartons. Wrapped or bundled product may be a plurality of interlocked automotive frames. Articles may be interlocked with each other.

The guide defines an inlet end and an outlet end. The outlet end may be referred to as a discharge end. The passageway is disposed between the inlet and outlet ends. A direction from the inlet end to the outlet end may be referred to as a first direction. A direction from the inlet end to the outlet end may be referred to as a case advance direction.

The guide may be provided with a straight portion and a curved portion. The straight section may define an inlet end of the guide and an inlet end of the apparatus. The curved portion may define a discharge end of the guide and an outlet end of the apparatus. The curved portion may be used to orient articles.

The discharge may be in a vertical plane or direction. The discharge may be in a horizontal plane or direction. In either discharge orientation, the articles may be oriented identically.

A direction from the inlet end to the outlet end may be referred to as a first direction. A direction from the inlet end to the outlet end may be referred to as a case advance direction.

The guide may be provided as a component with two straight sections disposed substantially normal to each other and a curved section disposed between two straight sections. It is not necessary that the two straight sections are disposed at ninety (90) degrees to each other. The two straight sections may be disposed at an angle of about eighty-six (86) degrees to each other. The two straight sections may be disposed at other angles. The angle may depend on the physical space where the guide is installed. The angle may depend on a permanent and/or a fixed structure that the guide needs to clear so that the articles can advance from the inlet end to the outlet end.

When the guide is provided with two straight sections, one straight section defines an inlet end of the guide and an inlet end of the apparatus. The other straight section defines a discharge end of the guide and an outlet end of the apparatus. In view of the above, the passageway being sized and shaped to receive a stack of cuboid cases therewithin.

The guide may be designed as a substantially L-shaped component between the inlet and discharge ends.

A direction from the inlet end to the outlet end may be referred to as a first direction. A direction from the inlet end to the outlet end may be referred to as a case advance direction.

Each straight section and the curved section may be designed with a first portion and a second portion disposed at a distance from each other to define a portion of the passageway. Each of first and second portions may be manufactured from a flat material having a uniform thickness throughout.

The guide may be designed with at least one straight portion. The guide may be designed with at least one curved portion. The guide may be designed with at least one straight portion and at least one curved portion.

The guide may be also designed with a retainer positioned to prevent unintended exit of the stack from the passageway mediate ends of the guide. The retainer may be provided as a flange on each of the first and second portions where the flanges are oriented toward each other. The retainer may be provided as a component that is positioned between the first and second portions. The retainer is designed to contact cases and therefore provide a support for cases being advanced within the passageway.

In view of the above, it will be understood that the guide is designed to house the stack of articles therewithin. Thus, the guide may be also referred to as a housing. It will be understood that the guide is designed to receive the stack of articles therewithin. Thus, the guide may be also referred to as a receptacle.

The device may be designed as an actuator and at least one lifting component coupled to the actuator. The at least one lifting component is sized and shaped to contact at least one article in the stack of article and maintain the contact during a movement of the article within the passageway. The actuator is designed to at least move the at least one lifting component.

The at least one lifting component may be coupled to the actuator for a pivotal movement between a first position where a portion of the at least one lifting component protrudes into the passageway and a second position where the portion is external to the passageway.

The at least one lifting component may be directly mounted on a portion of the actuator. The at least one lifting component may be indirectly connected to the actuator by way of an intermediate linkage or a component.

The actuator may be designed to only generate a reciprocal linear movement.

The actuator may be securely attached to one straight section, either directly or indirectly. The actuator may be fastened to the straight section. The actuator may be fastened to an intermediate mounting component (bracket) that is then fastened to the straight section. The actuator may be also permanently attached to the straight section, for example such as by a welding method.

The actuator may be provided as a cylinder, with a cylinder body, a piston and a cylinder rod that moves linearly toward to and away from the body. The cylinder may be of a pneumatic type. The cylinder may be of a hydraulic type.

The actuator may be provided as a rodless cylinder type with a cylinder body having two end caps, a piston and a carriage that moves linearly and reciprocally on an external surface of the cylinder body in a response to energy introduced into the interior of the cylinder body and moving the piston. The rodless cylinder may be of a type as manufactured by Festo North America Corporation of Hauppauge, NY under a model DGC, DGC-K, ELGD and the like.

The actuator may be provided as a screw coupled to a prime mover and a nut translating reciprocally on the screw during a rotation thereof. An optional linear position encoder may be provided and designed to output a signal defining an incremental translation distance (or travel) of the nut between terminal travel positions. The prime mover may be an electrically operable motor (i.e., an electric motor).

The actuator may be provided as an electric linear slide of a type as manufactured by Festo North America Corporation of Hauppauge, NY under a model EGSK.

The actuator may be provided as a servo type actuator. The servo type actuator may be referred to as a servo motor. The servo motor can rotate or move based on an input signal from a control unit (controller). The servo motor allows for precise control of angular or linear position, velocity and acceleration. It may consist of a motor coupled to a sensor for position feedback.

The servo motor may include an electric motor.

The servo type actuator may be adapted as a servo-hydraulic system, consisting of a servo convertor that drives a synchronous servo motor. This motor drives a constant pump. The control unit may be used to send pressure and flow volume values to the converter. Pressure and flow rate may be controlled at the converter by adjusting speed.

The actuator may be provided as two or more actuators as described above.

The actuator may be provided as an assembly with an electrically operable drive with an output shaft, a driving pulley attached to the output shaft, a driven pulley disposed at a distance from the driving pulley along the first and second directions, and an endless member caging driving and driven pulleys. The electrically operable drive may be a servo motor. The endless member may be a belt. The belt may be a notched belt. The belt may be a v-shaped belt. The endless member may be a chain. The endless member may be a cable. The endless member may be a wire.

The actuator may be adapted with an overload protection. The overload protection may be by way of measuring a current drawn by the actuator and terminating operation of the actuator when the current draw exceeds a threshold. The overload protection may be by way of monitoring a fluid pressure and terminating operation of the actuator when the fluid pressure exceeds a threshold.

When overload is detected, a movement (linear or rotational) of the actuator may be reversed to remove a source of the overload. Overload may be present when articles in the stack are unevenly positioned or a debris being present causing the stack to contact a portion of the guide during an upward lifting motion.

The at least one actuator, as described above may be referred to a conveyance means for conveying the stack of articles within the hollow interior (passageway) between ends of the guide.

The actuator with the at least one lifting component may be referred to as a lift.

The at least one lifting component may be adapted as an arm. The arm may be referred to or provided as a ratchet. The at least one lifting component may be referred to as a dog.

The at least one lifting component may be adapted as a plurality of dogs that may be provided in a ratchet arrangement with one or more actuators. Ratchet arrangement may be of the type as disclosed in U.S. Pat. No. 10,233,027 B1 issued to McCafferty et al. on Mar. 19, 2019 and titled "Material Handling Apparatus and Method U.S. Pat. No. 9,745,137 B1 issued to McCafferty et al. on Aug. 29, 2017 and titled "Apparatus, System And Method For Material Handling And/Or Processing", each incorporated in its entirety by a reference thereto.

The arm may be attached to the actuator, either directly or indirectly. Furthermore, the arm may be attached to a portion of the actuator that moves in a linear direction. In view of the above, such portion is defined as one of the cylinder rod, the carriage, the nut, and the endless member.

The arm may be disposed external to an edge of the straight section. This arm is mounted for a reciprocal and a linear movement along the edge of the straight section. The arm may be disposed at a distance from the edge to at least reduce frictional forces. The arm may be mounted to contact the edge during the reciprocal and linear movement so that the edge also provides a guide.

The arm may be disposed for the linear and pivotal movements though an elongated aperture through a thickness of the straight section. This arm is mounted for a reciprocal and a linear movement within the elongated aperture. The elongated aperture and the arm may be sized so that the elongated aperture guides the reciprocal and linear movement of the arm. This may aid in the linear movement of the actuator.

The arm is attached to the actuator with a pivot. The pivot may be fixed to the actuator and the arm may be adapted with an aperture to receive the pivot therewithin. The pivot may be fixed to the arm with the actuator being adapted with an aperture to receive the pivot on the arm. The aperture may be a blind aperture. The aperture may be a through aperture.

For the reasons to be described later, the arm may be biased, with a bias component, into the first position. The bias component may be a torsion spring. The bias component may be a rotary actuator. The rotary actuator may be a solenoid. The rotary actuator may be a valve. The bias component may be a linear actuator. This linear actuator may be a cylinder as described above. This linear actuator may be an electrically operable solenoid with a linearly moving component. The bias component may be a weighted portion on one end of the arm.

The pivot with the arm may be mounted within a hollow enclosure that is rigidly attached to the portion of the actuator for the linear reciprocal movement therewithin.

When the guide is provided with at least one straight portion and at least one curved portion, the device may advance the articles along the at least one straight portion and the at least one curved portion. When the guide is provided with at least one straight portion and at least one curved portion, the device may advance the article along the at least one straight portion only. When the guide is provided with at least one straight portion and at least one curved portion, the device may advance the article along the at least one curved portion only.

The apparatus may be provided as the device, as described above, without the guide. This apparatus may be installed, for example by way of a retrofit, onto a guide or other structure already in operation.

The apparatus may be adapted, configured and/or designed with an optional stop to prevent a movement of the case in a direction from the discharge end to the inlet end. The stop may be provided as a stop arm pivotally mounted on the guide and biased to protrude into the passageway.

Thus, in view of the above, at least a portion of the arm may be referred to as a protrusion.

The pivot with the arm may be mounted within a hollow enclosure that is rigidly attached to a portion of the guide adapted with an opening to allow protrusion of a portion of the arm into the passageway (hollow interior).

The stop may be designed as a one or more wheels contacting the advancing articles and controlled to at least temporarily restrain advancement of articles by way of friction.

The apparatus may be adapted with a base, where the guide is mounted on the base at the inlet end. The straight section containing the inlet end may be inclined at an angle of about four (4) degrees from a vertical plane to facilitate retention of the cases within the passageway. A surface of the base that is aligned with the passageway may be also inclined to bias the cases into the passageway.

The apparatus may be adapted, configured and/or designed (i.e. capable of) with an optional sensor positioned to sense one of a presence and an absence of a case within the passageway. Each sensor may be a limit switch. The limit switch will have an arm sized and positioned to contact the case. Each sensor may be a proximity sensor. Each sensor may be photo eye. Each sensor may be capable of generating a light curtain. Each sensor may be a scanner. The scanner may be a programmable scanner. The programmable scanner may be programmed to recognize objects being different than the case. The programmable scanner may be programmed to recognize a human hand. When the programmable scanner may be programmed to recognize a human hand, such scanner may be used as a safety device to terminate operation of the unstacker when detecting a hand within the passageway. The programmable scanner may be of a type as manufactured by Keyence Corporation of America in Itasca, IL. In either form, the sensor is electrically coupled to output a signal to the controller. The signal may represent a condition where the sensor senses the case. The signal may represent a condition where the sensor does not sense the case.

The apparatus may be adapted, configured and/or designed (i.e. capable of) with an optional device designed to bias the stack of articles into the passageway. This device may be offered by the Applicant of this application under a Model Number A1125150 and titled "Hook Stop". For the sake of reader's convenience, this device may include a hook, a first actuator to rotate the hook between a case engaging position and a retracted position and a second actuator to move the hook and the first actuator linearly toward the guide and away from the guide. The hook may be referred to as an arm. The hook may be designed as an L-shaped component. A length of the hook may be substantially equal to a height of the stack. A length of the hook may be sized smaller than a height of the stack. This device may decrease the dwell time associated with a new stack entering the inlet end of the apparatus. Accordingly, this device may increase throughput of destacking and inverting cases.

The device capable of biasing the stack of articles into the passageway may be also configured with a mounting component, a conveyor attached to the mounting component, a first case-engaging component attached to the mounting component, a second case-engaging component attached to the mounting component opposite to the first case-engaging component, and a device, connected to a power source, capable of moving first and second case-engaging components, between a first position and a second position in a response to a receipt of a control signal.

The mounting component may be a frame including at least two U-shaped components disposed at a distance from each other to receive the conveyor therebetween. Each U-shaped component may be adapted with adjustable feet. The mounting component may be adapted with braces spanning the distance between the two U-shaped components.

The conveyor may be supported on and mounted to the braces. The conveyor may be a chain conveyor with chains supported by tracks. Other types of conveyors are also contemplated herewithin. The conveyor may also include a portion extending outwardly from the mounting component.

The apparatus may include a pivotal connection between the first case-engaging component and the mounting component and a pivotal connection between the second case-engaging component and the mounting component.

The device may include an actuator and a linkage connecting the actuator to each case-engaging component at pivots two pivots.

The device may also be designed with a first sensor positioned to sense one of a presence and an absence of a case and a second sensor positioned at a distance from the first sensor along a length of the conveyor. Each sensor is illustrated may be a limit switch. The limit switch will have an arm sized and positioned to contact the case. Each sensor may be a proximity sensor. Each sensor may be photo eye. Each sensor may be capable of generating a light curtain. Each sensor may be a scanner. The scanner may be a programmable scanner. The programmable scanner may be programmed to recognize objects being different than the case. The programmable scanner may be of a type as manufactured by Keyence Corporation of America in Itasca, IL.

The apparatus may be adapted, configured and/or designed (i.e. capable of) with an optional device designed to prevent an unintended movement of the stack of articles from the passageway. This optional device may be designed as an arm and an actuator connected to the arm and to a source of energy. The actuator designed to pivot, in a response to one signal, the arm from a position where the arm being disposed adjacent the guide into a position where the arm protrudes into the passageway. The actuator is further designed to pivot, in a response to another signal, the arm in a reverse direction.

The apparatus may be adapted, configured and/or designed (i.e. capable of) with a combination of the optional device adapted, configured and/or designed to bias the stack of cases into the passageway (first device) and the device adapted, configured and/or designed to prevent the unintended movement of the stack of articles from the passageway (second device). In this combination the hook may be designed with a notch along the length of the hook to receive the arm of the second device. In this combination the arm of the second device can be pivoted when the stack is advanced into the passageway with the first device. Once the arm of the second device is pivoted to prevent unintended movement of the stack, the hook is retracted by the actuator to bias the next stack of cases advancing toward the guide.

The apparatus may be adapted, configured and/or designed (i.e. capable of) with an optional device designed to invert each and every case exiting the discharge end. Such device may be of the type as described in U.S. Pat. No. 4,706,798 issued to Hollmann on Nov. 17, 1987 and Pub. No. US 2013/0153366 A1 published to Kisch et al. on Jun. 30, 3013 which are incorporated in entirety in this document by reference thereto.

The apparatus may be adapted, configured and/or designed with an optional device to aid in removing trash from an interior of each inverted case. It will be understood that removing trash involves expulsion of foreign objects present within a case 10) from inverted cases.

This device is mounted adjacent the outlet end of the guide to receive cases that invert upon contact with the curved portion.

The device may be adapted, configured and/or designed with two pulleys and a conveyor that may be designed as a chain conveyor with two chains and two conveyor tracks. The pulleys may be mounted for a rotation within a hollow interior of the housing. The two conveyor tracks are also mounted within the hollow interior of the housing, each conveyor track being aligned with a respective pulley. The two conveyor tracks are disposed at a distance from each other to maximize exposure of the open top to a hopper disposed under the device.

The apparatus may be adapted, configured and/or designed (i.e. capable of) with an optional door that allows entry of a service personnel into the hollow interior of the guide through an opening.

The door may be used to clear jammed articles within the passageway.

The door may be interlocked, by way of a sensor, with a safety circuit. The sensor is electrically coupled to the control unit and is positioned to sense one of a presence and absence of the door. The control unit may be configured to receive an output signal from the sensor and at least terminate operation of the apparatus if the door is being opened or removed during such operation. Thus, the door may be referred to as a safety door. The safety door may eliminate a need for a safety curtain. Thus, the safety door may reduce the cost of the entire system.

Operation of actuator(s) may be controlled with a control unit. The control unit may be referred to as a controller. The control unit may include an enclosure that is mounted, either permanently or detachably, to a surface of the guide. The control unit may be mounted remotely from the guide.

When the actuator(s) operable by air or hydraulics, this control unit may include necessary valves and electrical components. When the actuator(s) operable by electrical energy, the controller may include necessary electrical components. The control unit may include a programmable logic controller (PLC). The control unit r may include a custom processor-based device. The control unit may be provided as a combination of PLC and processor-based device.

The operation of the apparatus will be now described on an example of cuboid cases used in a dairy installation, where the apparatus may be referred to as a "topout". In the dairy installation, these cases are returned to the dairy, stacked into vertical stacks with open ends facing upwardly. Each case includes four side walls, a bottom wall and an open top. The vertical stack may contain two (2) layers. The vertical stack may contain up to seven (7) cases, disposed in layers. Thus, the stack may have up to 7 layers, although more than seven (7) layers are contemplated herewithin when the cases are sized smaller than milk cases of 13"×13". The vertical stack may contain ten (10) or more layers. The vertical stacks are fed to the apparatus on a conveyor. The apparatus feeds the cases, one stack at a time, within the passageway to an elevated, horizontal conveyor called the run-off section. From this section, the cases are fed to a second horizontal conveyor and are inverted as they are deposited onto the conveyor. The overhead conveyor is usually positioned approximately eight feet above the floor and is effective to transfer the inverted cases to a washer or other piece of equipment.

When the stack of cases enters the passageway, the arm on the linear actuator may be already positioned below the bottom wall of the bottom most case. When the stack is fully contained within the passageway, the actuator receives a first signal from the controller to begin an upward linear movement in a first direction from the inlet end of the guide toward the outlet (discharge) end of the guide. The first signal may be in a response to a sensor sensing the stack and generating a signal received by the controller. If the arm is not is not positioned below the bottom wall of the bottom most case, an additional dwell time may be needed.

The arm travels with the portion of the actuator and advances the stack along the passageway. The arm travels a distance sufficient for the bottom wall of the bottom most case in the stack to pass the stop arm about equal to a height of stacked cases, the stop arm pivots downwardly, due to bias, and now protrudes into the passageway. The actuator now receives a second signal to begin a downward movement in a second direction being opposite to the first direction. The stack of cases is allowed to partially move in the second direction to contact the stop arm, but is otherwise prevented from further movement in the second direction. The actuator now receives another first signal to begin an upward movement and advance next stack of cases entered the passageway. Even if the next stack enters the passageway before return of the arm, the arm is free to pivot upwardly upon contact with the stack. After the arm passes the bottom wall of the bottom most case, the arm is biased into the first position below the bottom wall. When the upper most case in the next stack contacts the bottom most case in the preceding stack, next stack advances the preceding stack further along the passageway, including the curved section.

The stack of cases enters the passageway with a bottom wall of the case nested within the open top of the case below it by way of a shoulder (nest ring) on an exterior surface of the bottom wall. A height of such shoulder may be about half (0.5) of an inch. When the stack advances through the curved section of the guide, the cases begin to separate from each other where the shoulder is no longer seated within the open top of the container below it. Thus, the cases are discharged one at a time from the outlet end of the guide. The curved section may carry such outlet end.

When the apparatus is adapted with the optional device designed to bias the stack of cases into the passageway, the first actuator receives a first signal to engage the stack of cases moved into a waiting position in front of the guide. When the stack of cases within the passageway is advanced upwardly, the second actuator receives a second signal to move the stack from the waiting position into the passageway.

To reduce dwell time of the stack within the passageway, optimizing travel time and thus optimizing throughput, the apparatus may be adapted with two devices, each including a case engaging arm and designed to advance stack of cases a partial distance or length of the passageway.

A handoff may be provided to an unlimited number of lifts in a vertical direction. The lift can go to a landing and approach another lift. The lift can land on another landing, and another lift. In other words, a plurality of guides, actuators and stops may be used to lift (advance) the articles in a vertical direction. Thus, the plurality of guides, actuators and stops may be used to increase a travel distance of the articles. The plurality of guides, actuators and stops may be provided as kits and assembled at an application site.

Multiple stacks may be lifted at once, using multiple arms (dogs, ratchets, etc).

A final stage, after exit from the outlet end, may include a spiral, that can rotate orientation instead of rotating open side down by the method described above Stacks of articles of a variety of kinds may be elevated to move vertically, or at an incline, and not unstack.

Multiples of combinations can be used.

Cylinders may be positioned in a side by side on opposite sides, or on a side and back (perpendicular to each other, and can lift in team. Dogs can be positioned at separate elevations but lift in sequence and speed, to support separate elevations (such as automotive frames).

One device may be mounted on one side of the guide and the other device may be mounted on the opposite side of the guide at different elevations from each other, each being biased toward one end of the apparatus. In this arrangement, the stop may be disposed mediate terminal positions of the arms, with one arm being in an extended position and another arm being in a retracted position.

In view of the above, the apparatus may be designed absent of any conveyors.

Now in a reference to the drawings.

FIG. 1 illustrates a perspective view of an apparatus 20 that is capable of unstacking a stack of cases and inverting each case onto its open top.

The apparatus 20 is illustrated as including a device 60. The device 60 may be referred to as a conveyance means 60.

The apparatus 20 is illustrated as including a guide 30 and a device 60.

In view of the above, the apparatus 20 may be referred to as case unstacker and inverter. In view of the above, the guide 30 may be referred to as a component 30.

The guide 30 is illustrated with an inlet end 32, an outlet end 34 and a hollow interior 36 between inlet and outlet ends, 32 and 34 respectively. The hollow interior 36 being sized and shaped to receive a stack of cases 10 therewithin. The hollow interior 36 may be referred to as a passageway 36.

The guide 30 is illustrated as including two elongated components 40 being spaced from each other along a width of the guide 30. Each elongated component 40 includes at least a straight portion 42 and a curved portion 44. Each elongated component 40 is also illustrated with another (optional) straight portion 46 at an opposite end of the curved portion 44 and at the outlet end 34 of the guide 30. Straight portions 42 also define a straight section of the guide 30. Curved portions 44 also define a curved section of the guide 30. Straight portions 46, when provided, also define another or a second straight section of the guide 30.

The guide 30 is further illustrated as including two additional elongated components 50. Each additional elongated component 50 being aligned with and disposed at a distance from a respective elongated component 40. The distance sized sufficiently to allow passage of the cases 10 through the hollow interior 36. The two additional elongated components 50 may be also referred to as retainers that prevent unintended movement of the cases 10 from the hollow interior 36.

The guide 30 is also illustrated with a component 48 attached to the elongated components 40 and having a curved portion 49.

The device 60 is capable of moving the stack of cases 10 within the hollow interior 36 from the inlet 32 end to at least the outlet end 34.

The device 60 is illustrated as including a first rodless cylinder 70 one side of the guide 30 and a second rodless cylinder 80 an opposite side of the guide. The second rodless being 80 offset from the first rodless cylinder 70 in a direction between the inlet and outlet ends, 32 and 34 respectively.

A first arm 90 is pivotally connected to a carriage 72 on a body 71 of the first rodless cylinder 70 for a movement with the carriage 72 in a linear direction and for a pivoting between a case engaging position and a case disengaging position.

A second arm 100 is pivotally connected to a carriage 82 on a body 81 of the second rodless cylinder 80 for a movement with the carriage 82 on the second rodless cylinder in the linear direction and for a pivoting between the case engaging position and the case disengaging position.

A third arm 110 is pivotally mounted on the bracket 112 to one of one and another sides of the guide 30 mediate terminal positions of first and second arms, 90 and 100 respectively, the third arm 110 pivots between the case engaging position and the case disengaging position.

FIG. 1 illustrates the first arm 90, the second arm 100 and the third arm 110 in the case engaging position.

Figure 2:
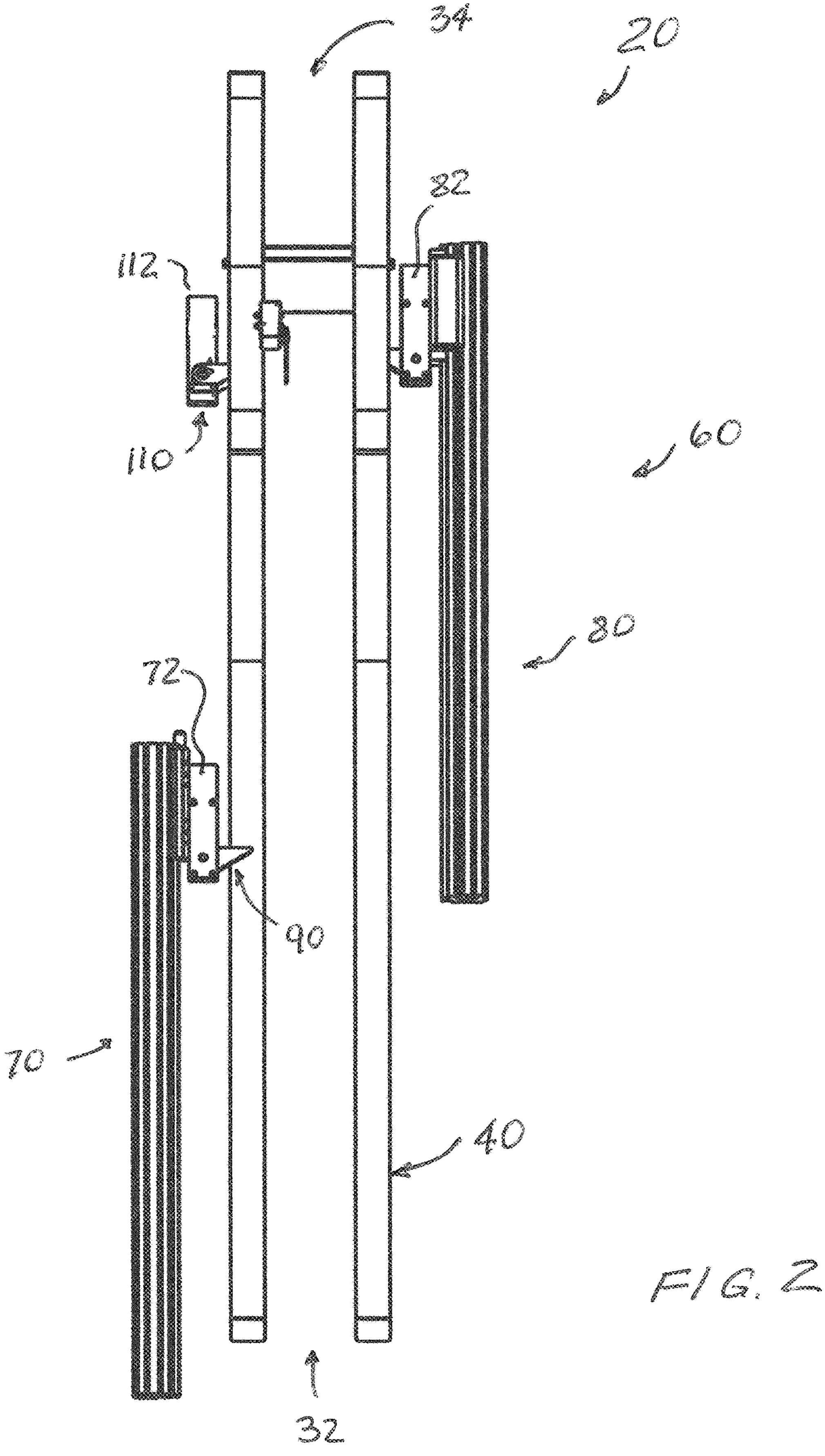
FIG. 2 illustrates an elevation view of the case unstacker and inverter of FIG. 1.

FIG. 2 illustrates an elevation view of the apparatus 20 of FIG. 1.

Figure 3:
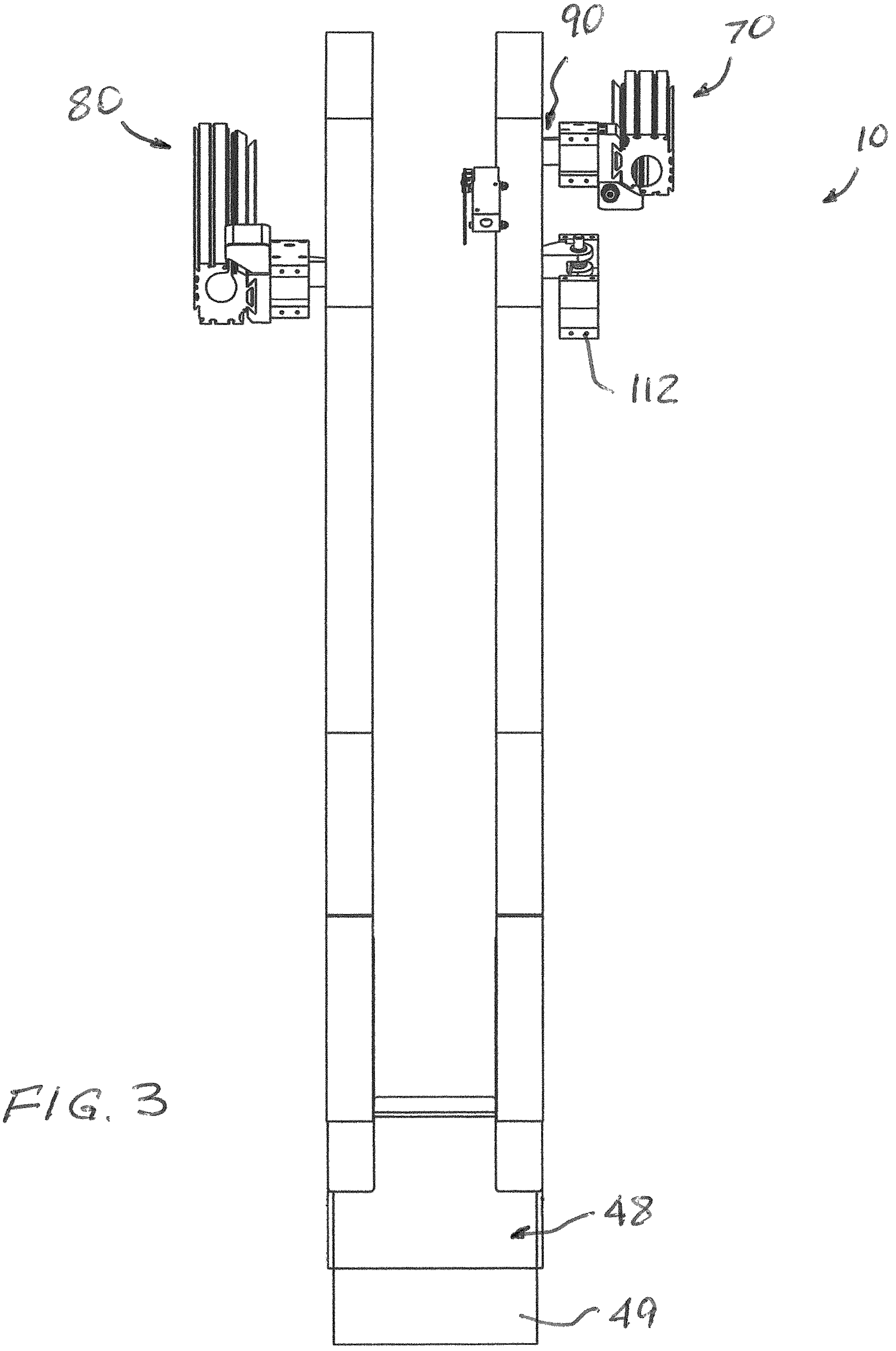
FIG. 3 illustrates a planar view of the case unstacker and inverter of FIG. 1.

FIG. 3 illustrates a planar view of the apparatus 20 of FIG. 1.

Figure 4:
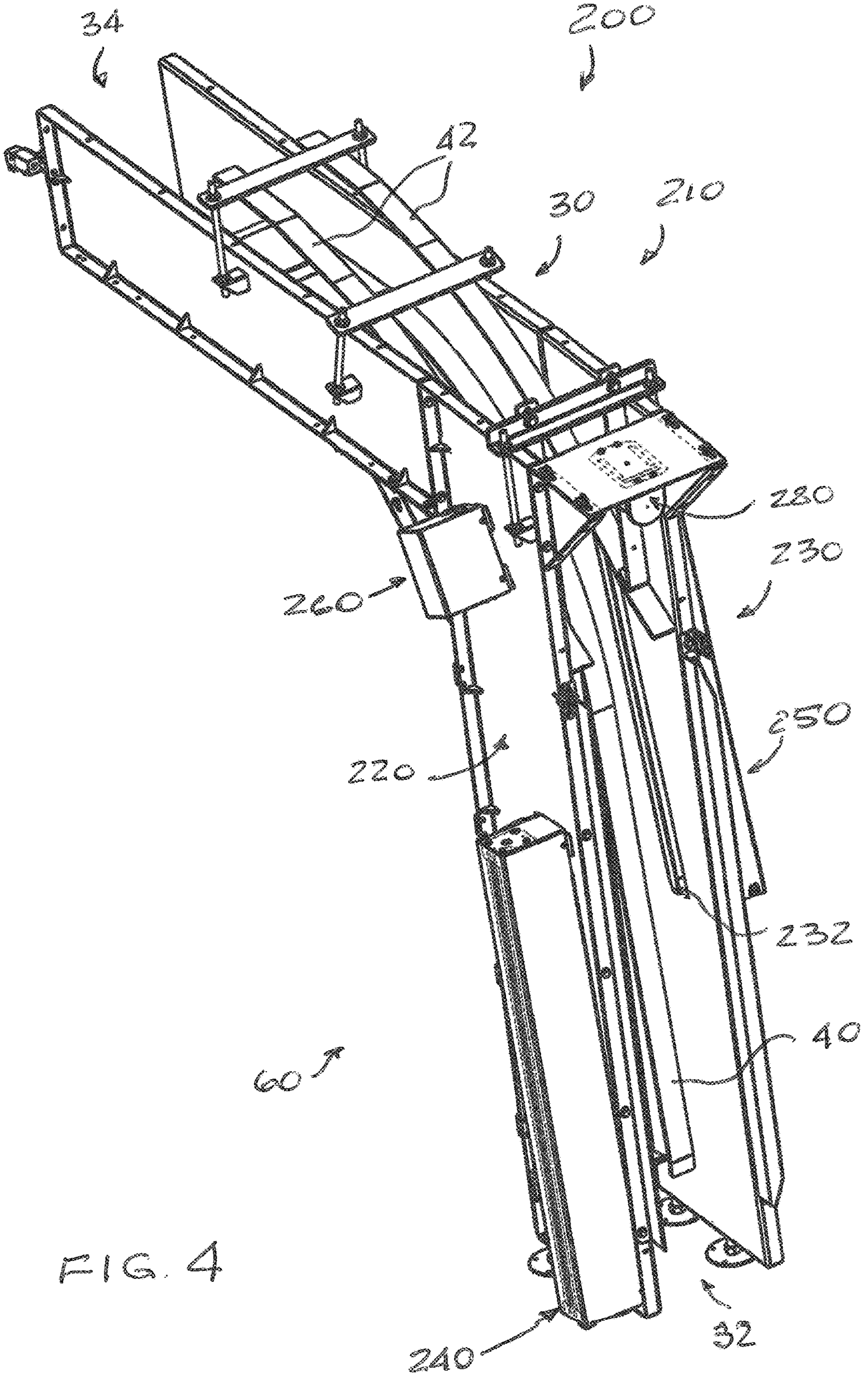
FIG. 4 illustrates a perspective view of a case unstacker and inverter.

FIG. 4 illustrates a perspective view of the apparatus 200.

The apparatus 200 includes the guide 30, as described above and illustrated in FIGS. 1-3 and the device 60, as described above and illustrated in FIGS. 1-3.

The guide 30 is being further illustrated with two sides 220 and 230 disposed at a distance from each other along the width of the guide 30. The two sides 220 and 230 may define the housing (that may be referred to as a frame, an enclosure and/or a mounting component) 210 for the guide 30 and the device 60.

The side 230 is illustrated as including an elongated aperture 232 through a thickness of the side 230. The elongated aperture 232 aligned in a direction between the inlet and outlet ends, 32 and 34 respectively.

The apparatus 200 is being further illustrated as including a housing (that may be referred to as a frame, an enclosure and/or a mounting component) 240 that envelops the first rodless cylinder 70, a housing that may be referred to as a frame, an enclosure and/or a mounting component) 250 that envelops the second rodless cylinder 80, and a housing (that may be referred to as a frame, an enclosure and/or a mounting component) 260 that envelops the third arm 110 and that may include the bracket 112.

FIG. 4 also illustrates a sensor 280 mounted in a position to sense one of a presence and an absence of a case 3 between inlet and outlet ends of the guide 30.

Figure 5:
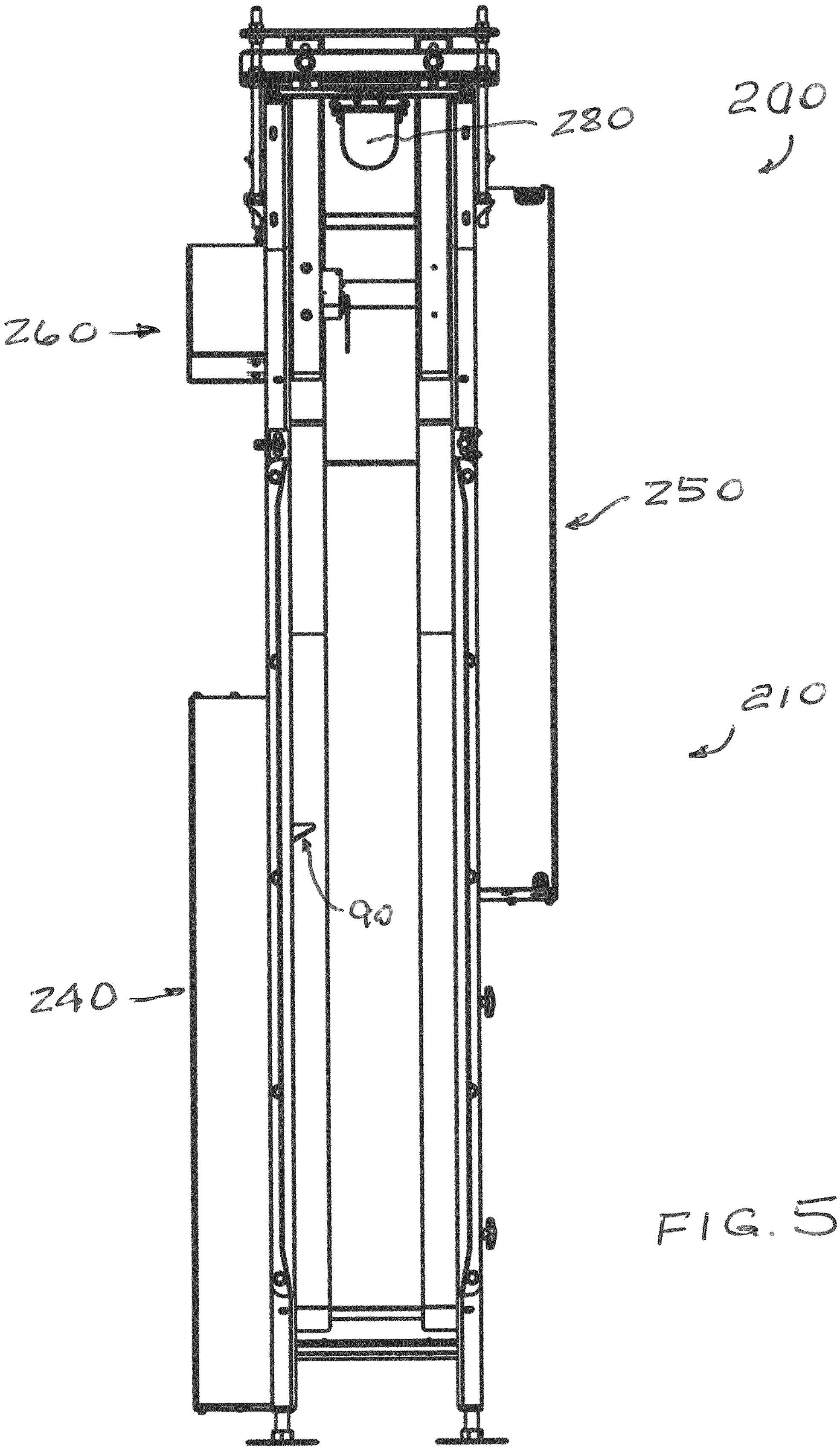
FIG. 5 illustrates an elevation view of the case unstacker and inverter of FIG. 4.

FIG. 5 illustrates an elevation view of the apparatus 200 of FIG. 4.

Figure 6:
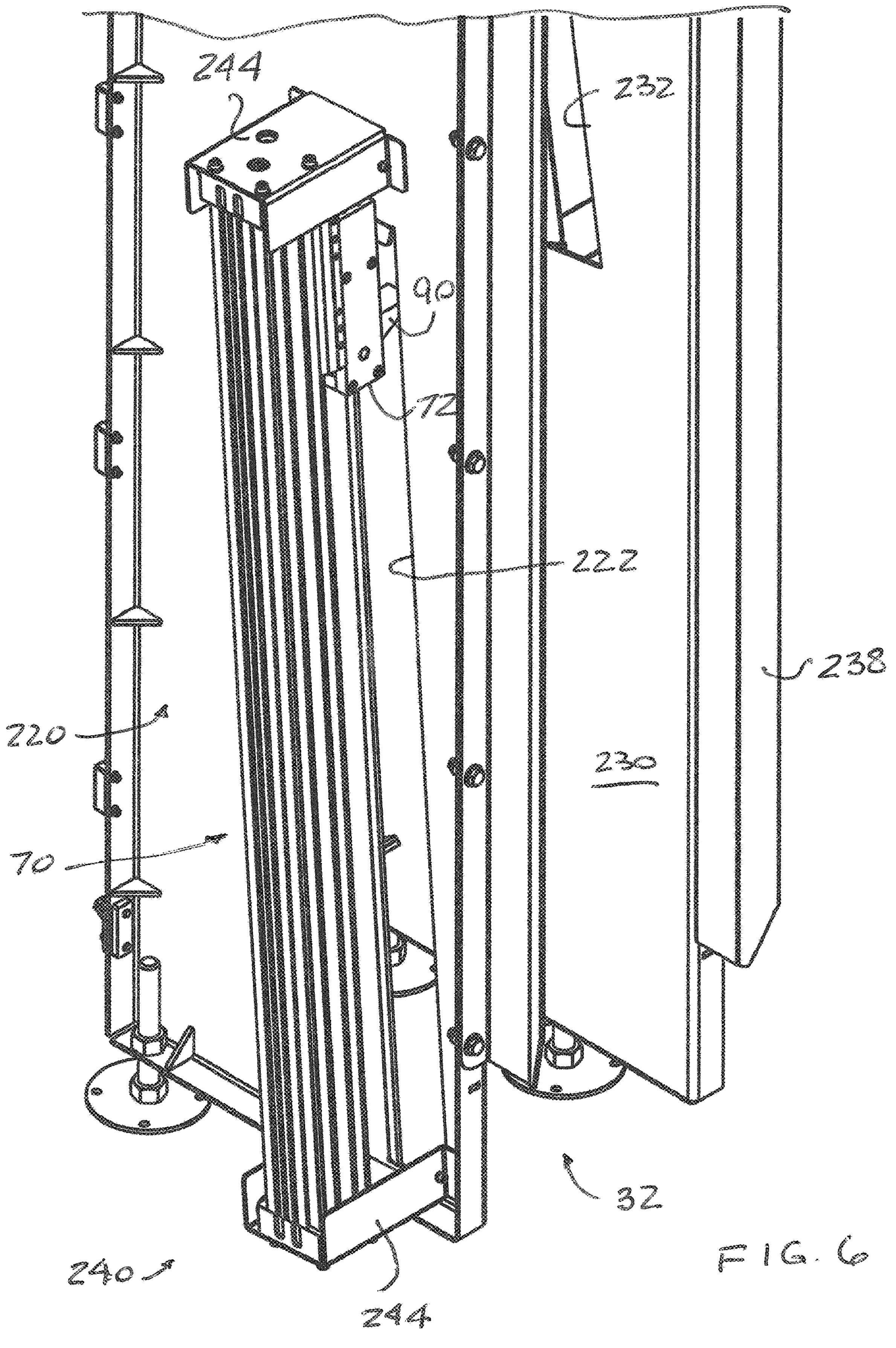
FIG. 6 illustrates a partial perspective view of the case unstacker and inverter of FIG. 4.

FIG. 6 illustrates a partial perspective view of the apparatus 200 of FIG. 4. The side 220 is illustrated with an aperture 222 that allows a portion of the first arm 90 to protrude into the hollow interior 36. A portion of the housing 240 removed for clarity to expose the first rodless cylinder 70 and the ends 244 of the housing 240. The above described elongated components 40 may be provided as flanges of on sides 220. The above described elongated components 40 may be rigidly and/or permanently attached to sides 220, for example by use of welds, adhesives and like techniques. A guide 238 is also illustrated to aid in biasing the articles 10 into the passageway.

Figure 7:
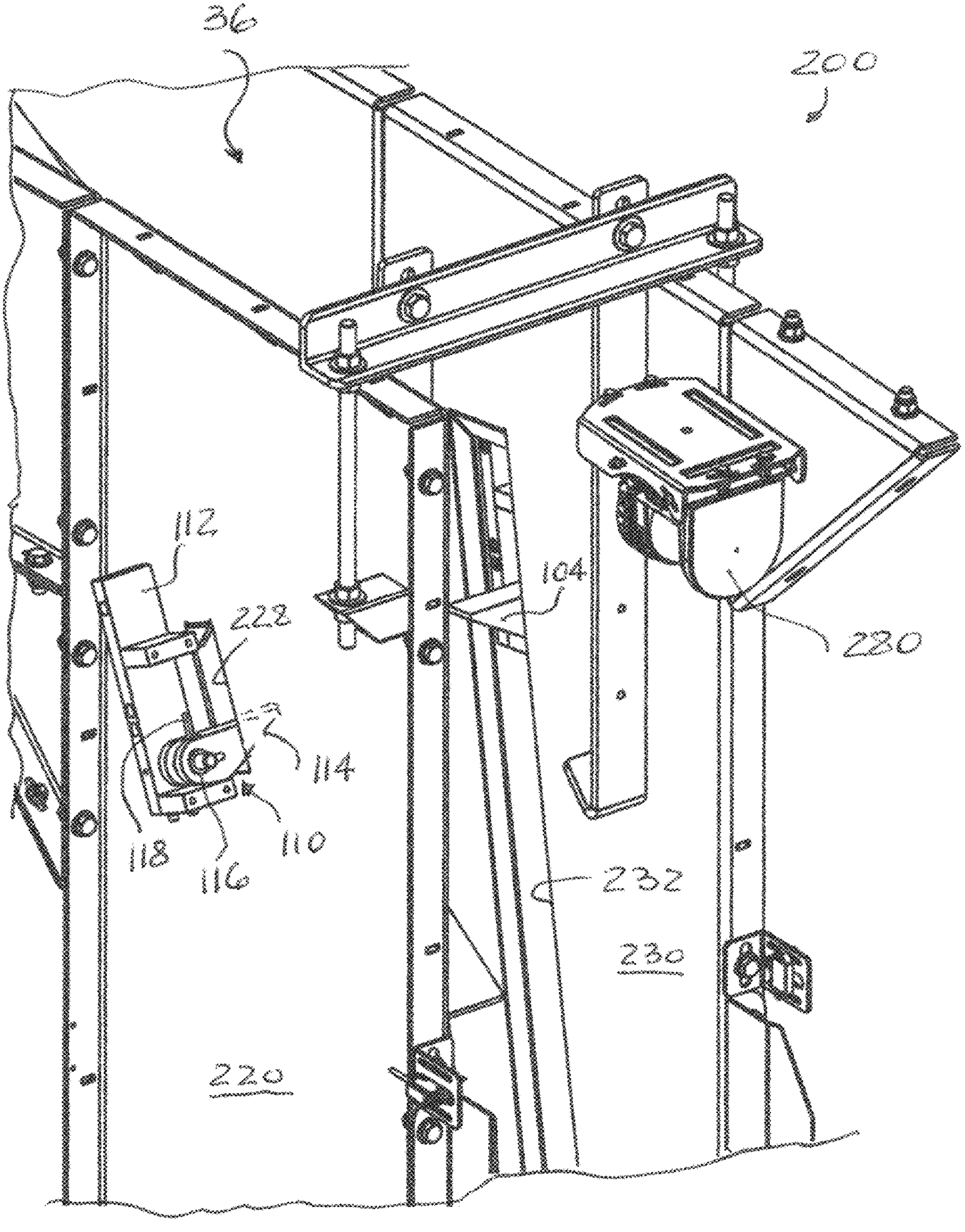
FIG. 7 illustrates a partial perspective view of the case unstacker and inverter of FIG. 4.

FIG. 7 illustrates a partial perspective view of the apparatus 200 of FIG. 4. The side 220 is illustrated with another aperture 228 being disposed at a distance from an end of the elongated aperture 222, the end being disposed closer to the outlet end 34. The aperture 228 allows a portion 114 of the third arm 110 to protrude into the hollow interior 36. FIG. 7 also illustrates a pivotal connection 116 between the third arm 110 and the bracket 112. A bias spring 118 is also illustrated to bias the third arm 110 into the case engaging position.

Figure 8:
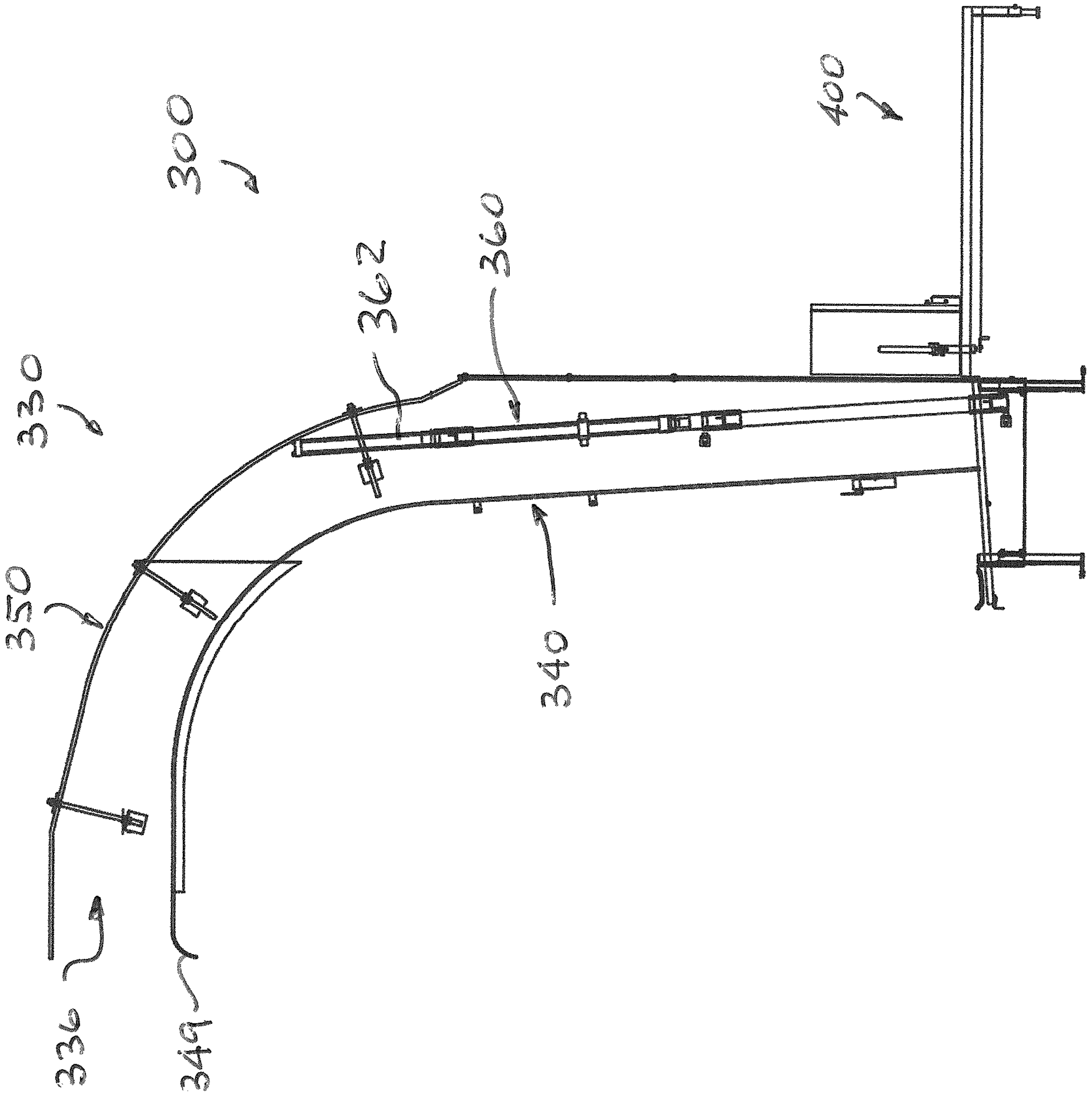
FIG. 8 illustrates an elevation view of a case unstacker and inverter.

FIG. 8 illustrates an elevation view an apparatus 300 that is capable of unstacking a stack of cases 10 and inverting each case 10 onto its open top. The apparatus 300 is illustrated as including a guide 330 and a device 360. The guide 330 may be designed as the above described guide 30. For the sake of brevity, the guide 330 may include a first pair of elongated components 340 and another pair of elongated components 350, each with at least a straight portion and a curved portion that define a hollow interior 336. An end component with a curved portion 349 is also illustrated.

The device 360 includes two long stroke cylinders with rods 362, only one of which is illustrated in FIG. 8. The above described arms of FIGS. 1-7 are also used in the apparatus of FIG. 8.

FIG. 8 also illustrates a device 400 positioned adjacent an inlet end. The device 400 may be capable of biasing the stack of cases 10 into the hollow interior 336 and/or alleviating pressure onto the stack of cases 10 positioned within the hollow interior 336 from stacks of cases 10 advancing on a conveyor toward the apparatus 300.

Figure 9:
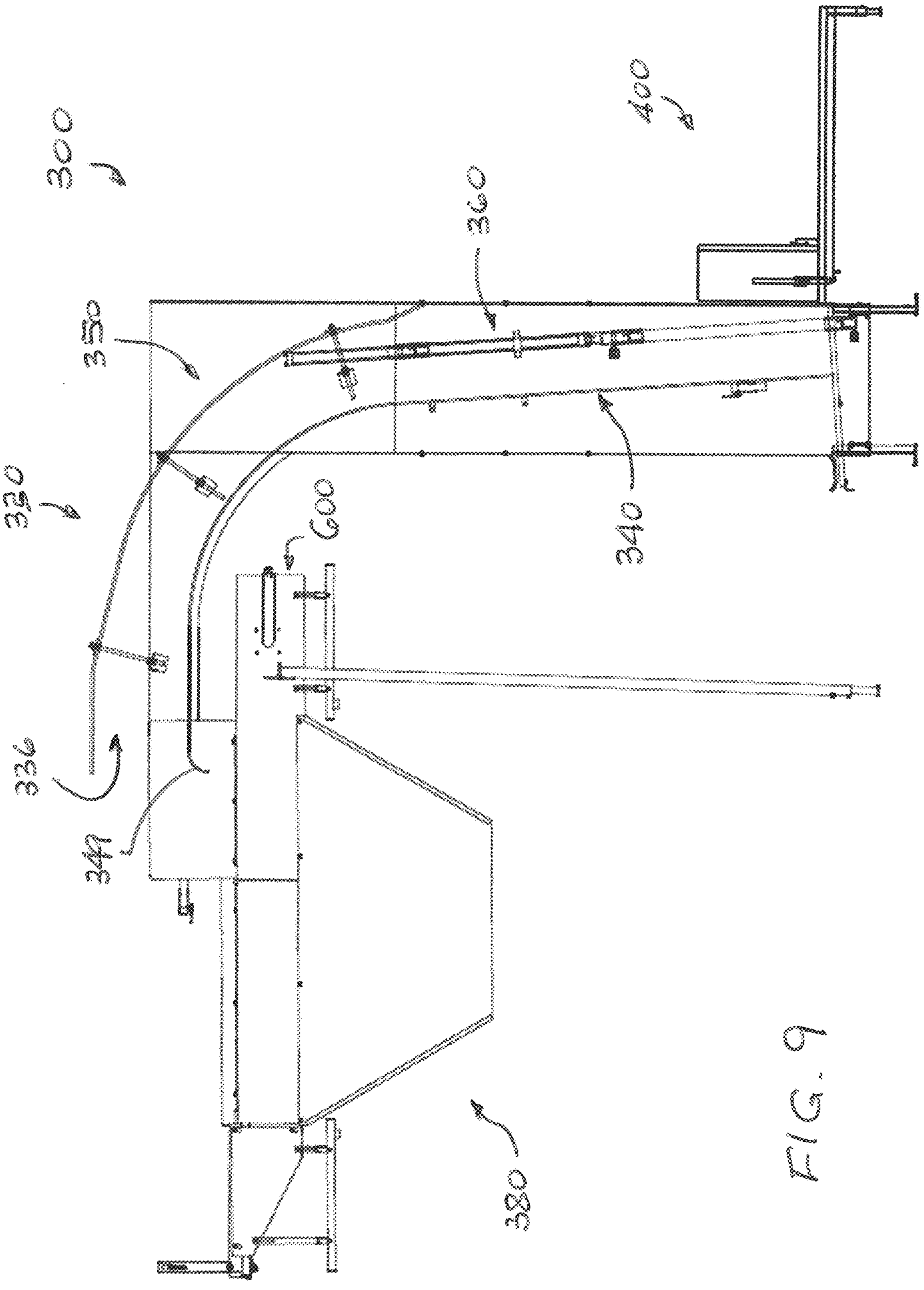
FIG. 9 illustrates an elevation view of the case unstacker and inverter of FIG. 8.

FIG. 9 illustrates an elevation view of the case unstacker and inverter of FIG. 8 and further illustrates a hopper 380 positioned adjacent the outlet end that may be used for receiving trash from cases 10 inverted at the curved portion 349 and received within the device (apparatus) 600 to be described further in this document.

Figure 10:
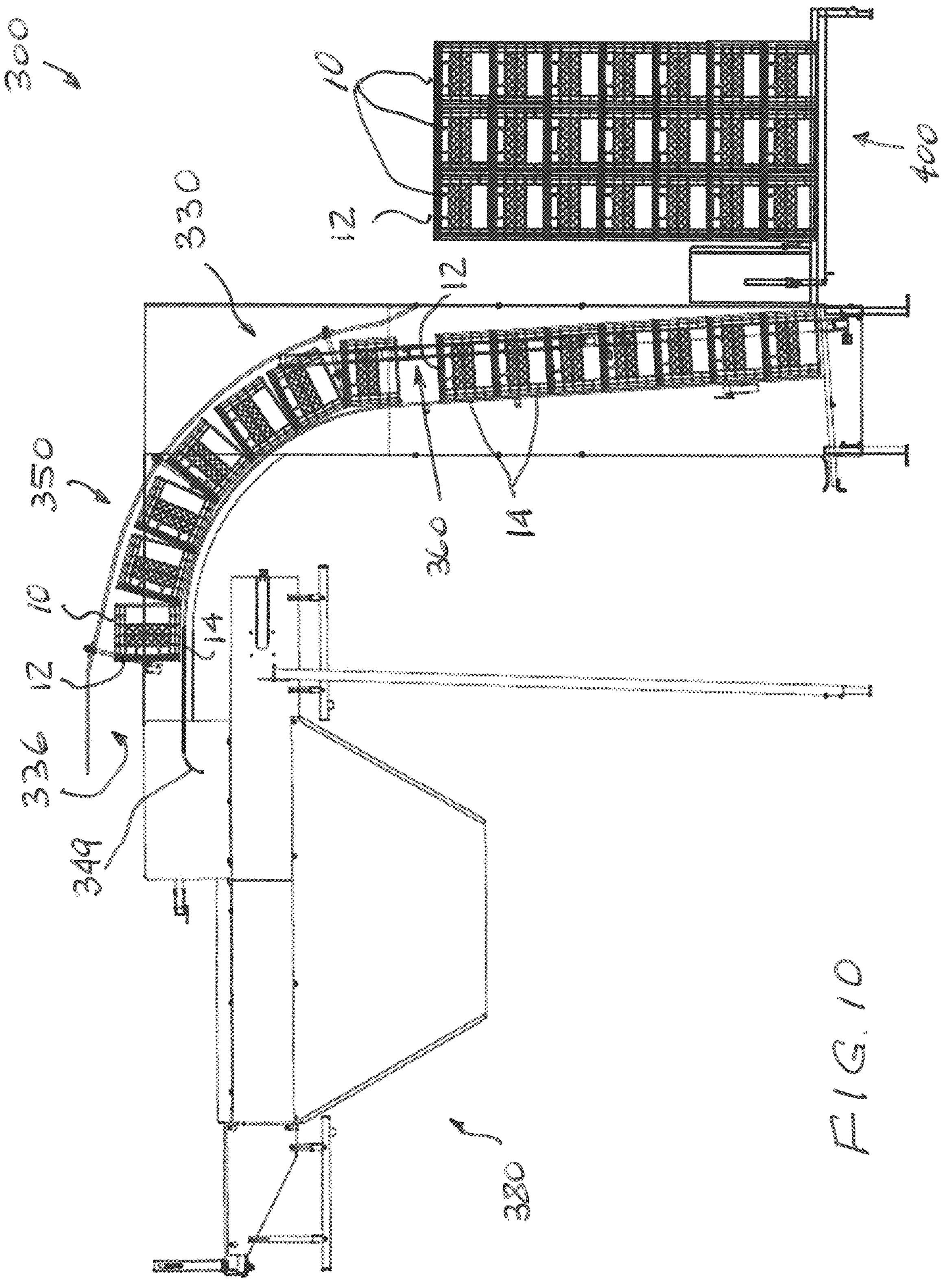
FIG. 10 illustrates an elevation view of the case unstacker and inverter of FIG. 8.

FIG. 10 illustrates an elevation view of the case unstacker and inverter of FIG. 8 and further illustrates stacks of cases 10 inside the hollow interior (passageway) 336 as well as stacks of cases 10 positioned external to the guide 330 and waiting to be received within the inlet end of the guide 330.

FIG. 10 illustrates that cases 10 enter the inlet end in an upright position with the open top 12 being disposed upwardly in a generally horizontal plane. As the cases 10 advance, by devices 360, within the hollow interior 336 along a length of the guide 330, each case transitions to a position where the case 10 is disposed on its side wall 14 with the open top 12 now being dispose din a generally vertical plane. As the case 10 continues to advance through the outlet end, such case 10 inverts onto the open top 12 at the curved portion 349.

Figure 11:
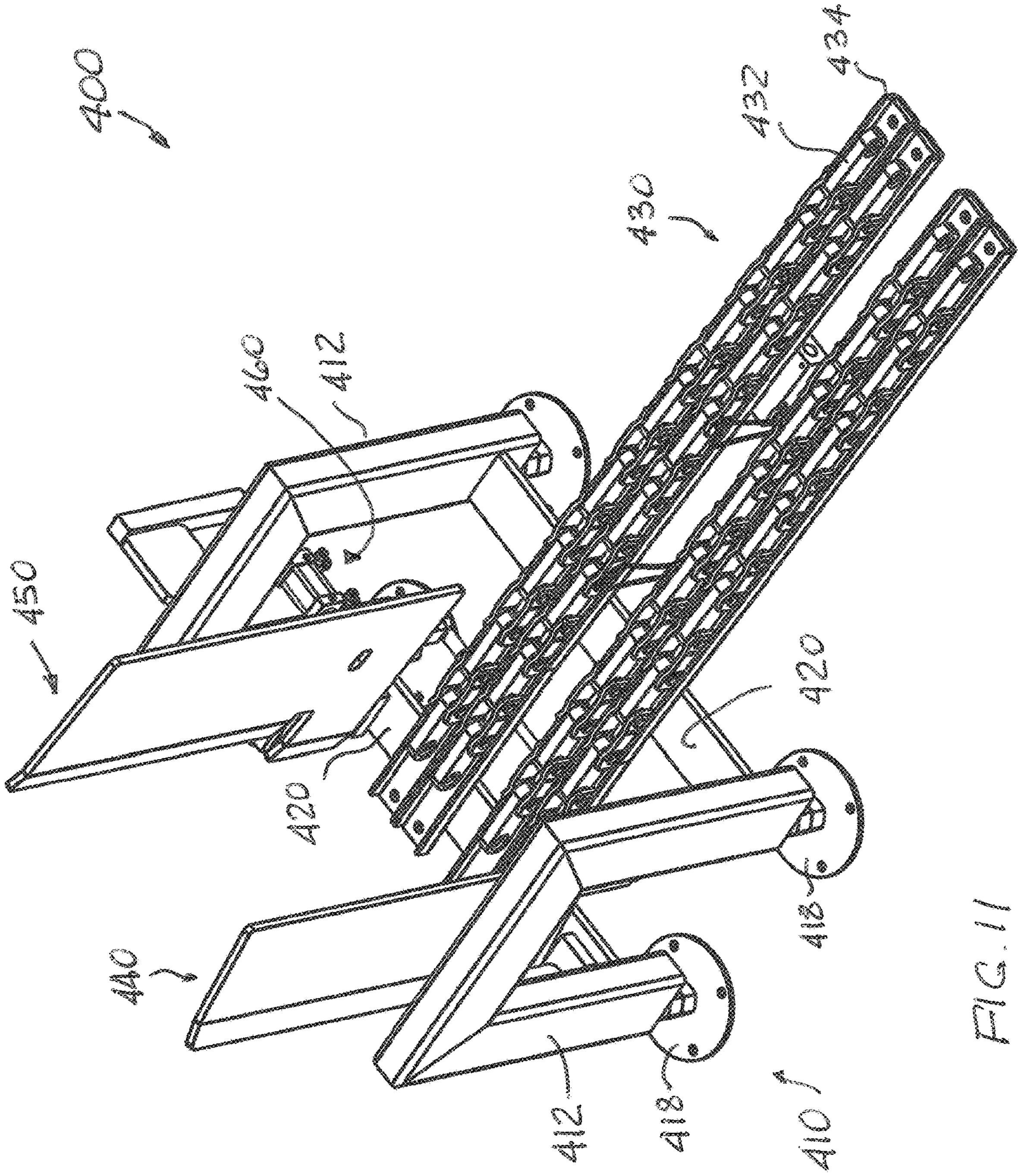
FIG. 11 illustrates a perspective view of a device capable of advancing stack of cases into the case unstacker and inverter of FIGS. 1-10.

FIG. 11 illustrates a perspective view of a device 400 that is capable of advancing (biasing) stacks of cases into the case unstacker and inverter of FIGS. 1-10. The device 400 is illustrated as including a mounting component 410, a conveyor 430 attached to the mounting component 410, a first case-engaging component 440 attached to the mounting component 410, a second case-engaging component 450 attached to the mounting component 410 opposite to the first case-engaging component 440, and a device 460 capable of moving first and second plate-shaped components, 440 and 450 respectively, between a first position and a second position in a response to a receipt of a control signal.

The mounting component 410 is illustrated as a frame including at least two U-shaped components 412 disposed at a distance from each other to receive the conveyor 430 therebetween. Each U-shaped component 412 may be adapted with adjustable feet 418. The mounting component 410 is further illustrated with braces 420 spanning the distance between the two U-shaped components 412.

The conveyor 430 is illustrated as being supported on and mounted to the braces 420. The conveyor is further illustrated as a chain conveyor with chains 432 supported by tracks 434. The conveyor 430 is also illustrated with a portion extending outwardly from the mounting component 410. For the sake of brevity, the conveyor drive is not illustrated in FIG. 11.

The chain 432 may be a plastic chain. The chain 432 may be a metal chain. Although chain conveyor is illustrated, other conveyors, for examples such belt conveyors and ratchet conveyors may be provided within the device 400. Furthermore, the conveyor 430 may be replaced by friction-type wheel drives. The conveyor 430 may be provided without a conveyor drive with additional device adapted to advance stacks 10.

The device 400 is further illustrated with a pivotal connection 448 between the first case-engaging component 440 and the mounting component 410 and a pivotal connection 458 between the second case-engaging component 450 and the mounting component 410.

Figure 12:
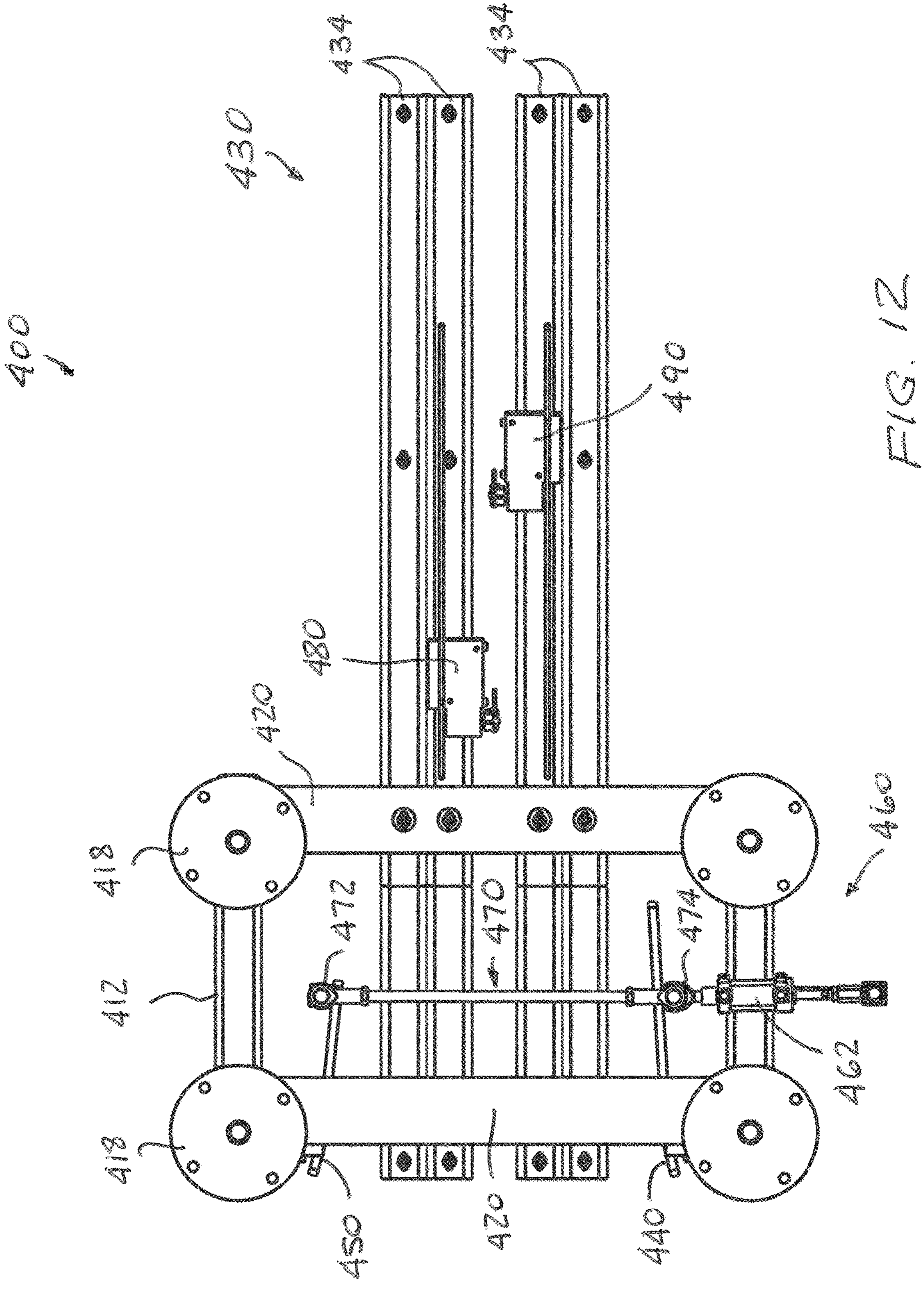
FIG. 12 illustrates a bottom view of the device of FIG. 11.

FIG. 12 illustrates a bottom view of the device 400 of FIG. 11. The device 460 is illustrated with an actuator 462 and a linkage 470 connecting the actuator 462 to each case-engaging component at pivots 472 and 474. More particularly, the actuator 462 is illustrated as a cylinder but may be, in view of the above, any one of a linear actuator, a belt and a servo motor, or the like devices designed to generate a linear motion. The actuator 462 and respective linkage may be replaced with individual actuators, for example such as rotary solenoids, to pivot case-engaging components 440 and 450.

The device 400 is further illustrated with a first sensor 480 positioned to sense one of a presence and an absence of a case 10 and a second sensor 490 positioned at a distance from the first sensor 480 along a length of the conveyor 430. Each sensor 480, 490 is illustrated as a limit switch. In view of the above, the sensor 480, 490 may be any one of a photo eye, infrared sensor, a proximity sensor and the like sensor capable of sensing presence or an absence of the article or the stack.

Figure 13:
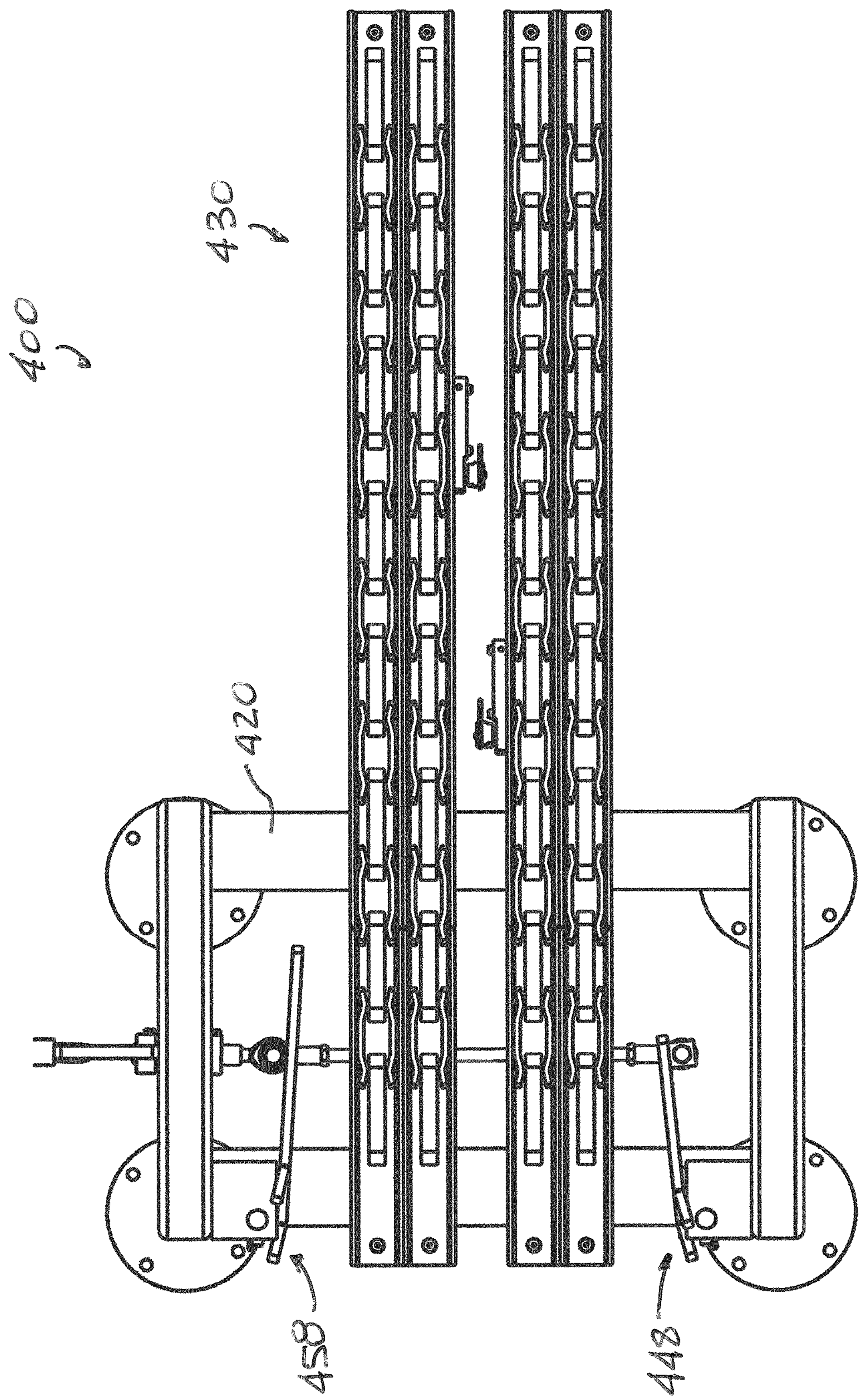
FIG. 13 illustrates a top view of the device of FIG. 11.

FIG. 13 illustrates a top view of the device 400 of FIG. 11.

Figure 14:
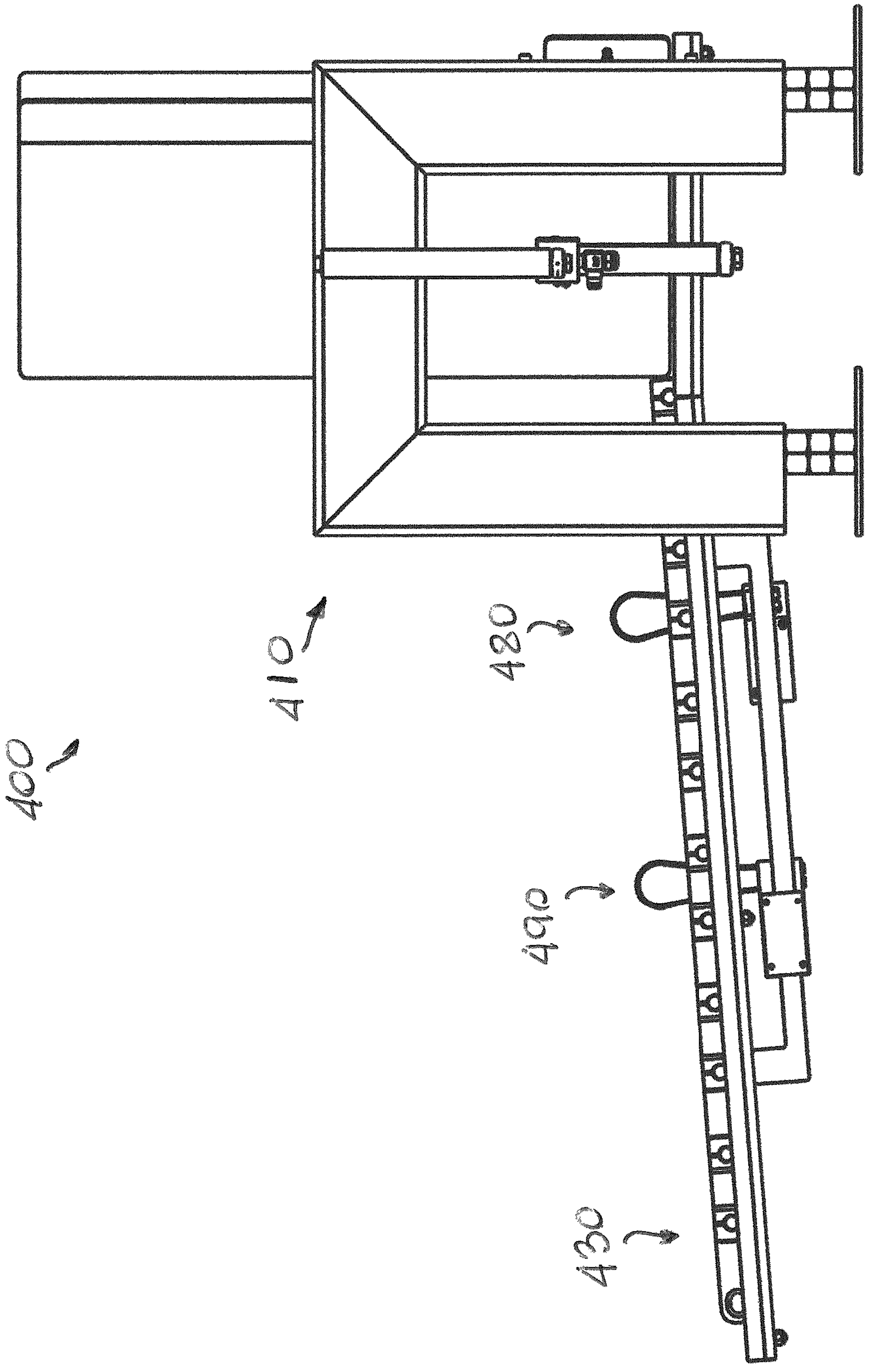
FIG. 14 illustrates an elevation view of the device of FIG. 11.

FIG. 14 illustrates an elevation view of the device 400 of FIG. 11. The conveyor 430 is illustrated as inclined upwardly toward the frame 410 but can be positioned horizontally or inclined downwardly toward the frame 410.

Figure 15:
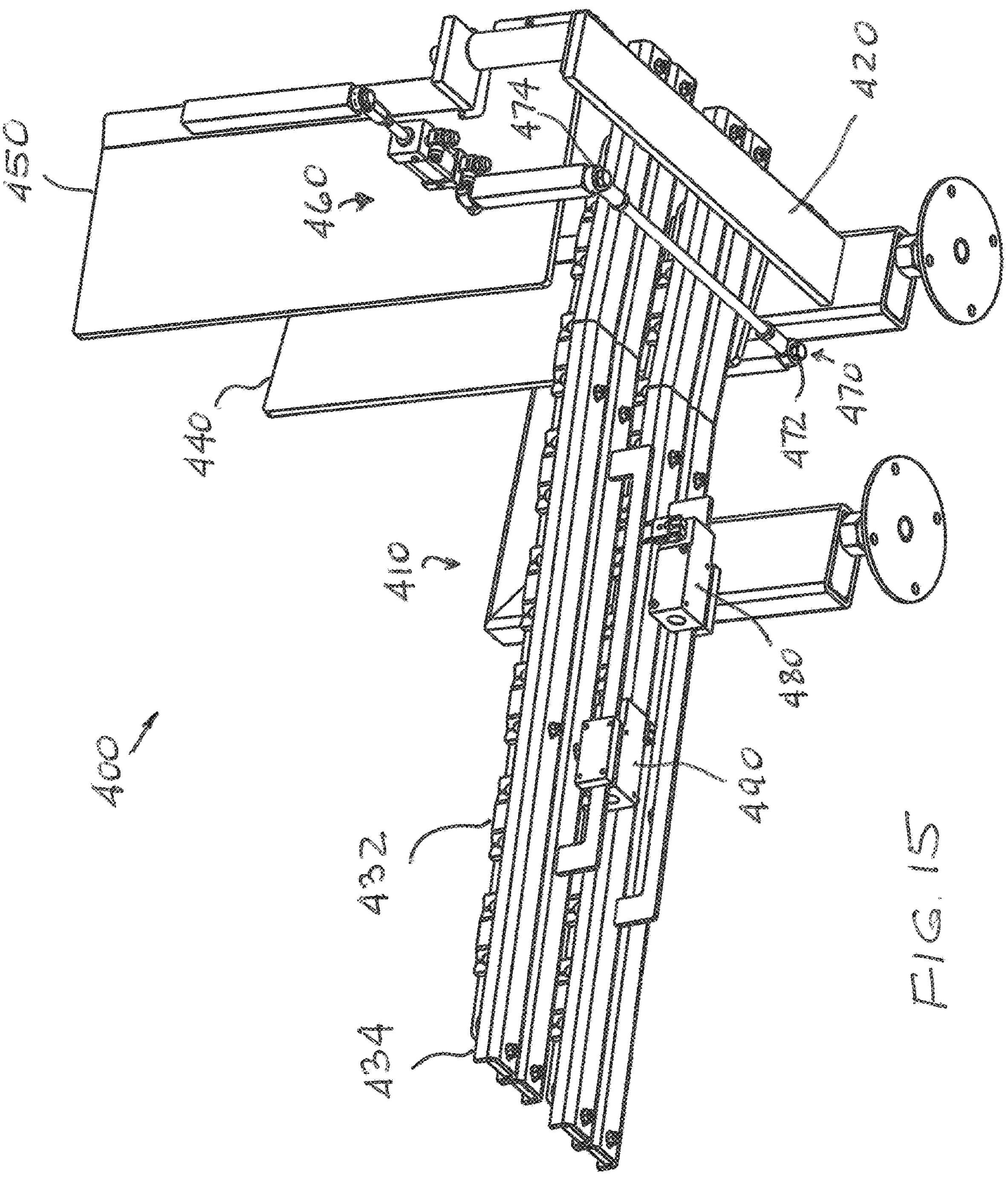
FIG. 15 illustrates a perspective view of the device of FIG. 11.

FIG. 15 illustrates a perspective view of the device 400 of FIG. 11.

Figure 16:
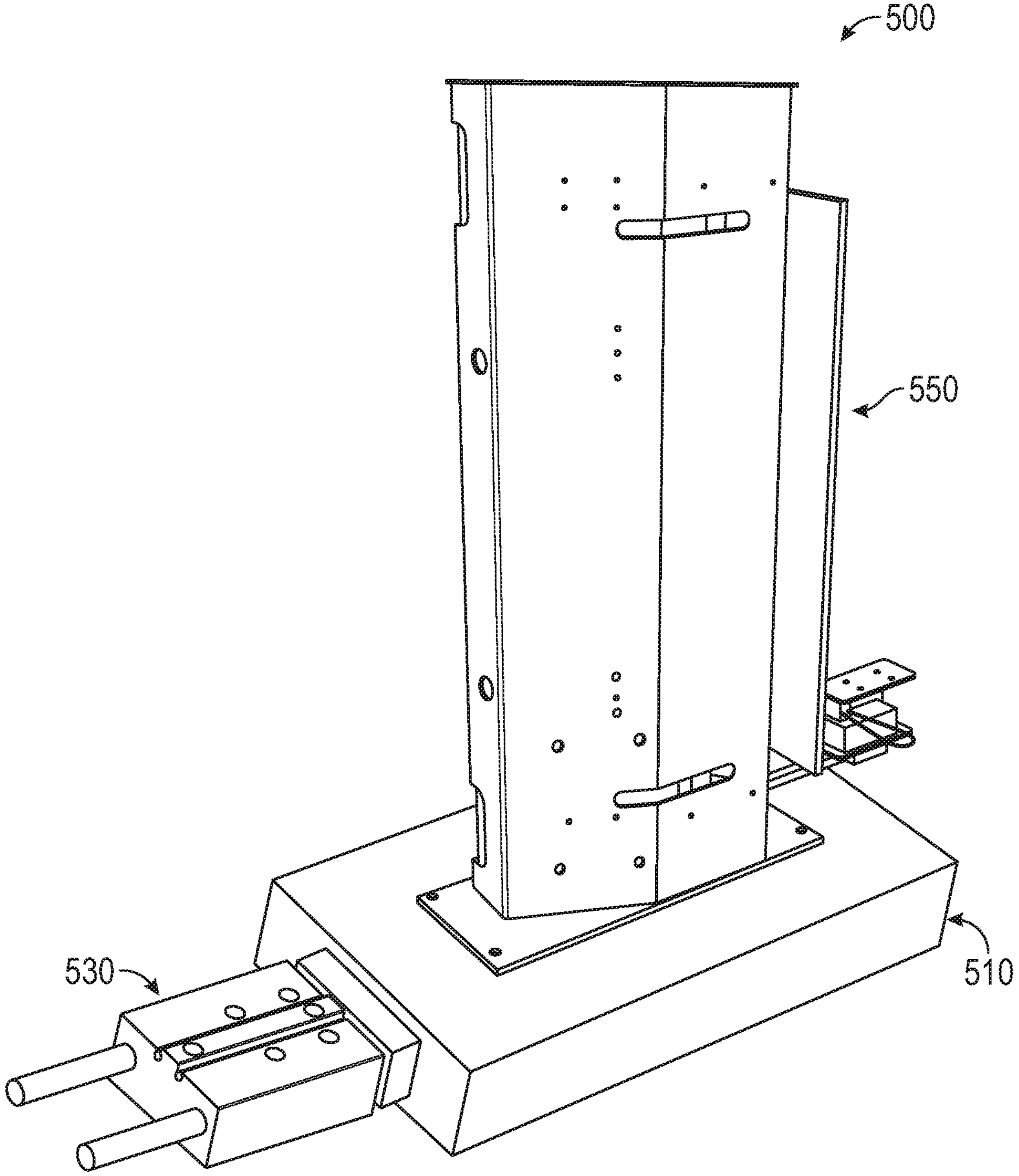
FIG. 16 illustrates a perspective view of a device capable of advancing stack of cases into the case unstacker and inverter of FIGS. 1-10.
Figure 17:
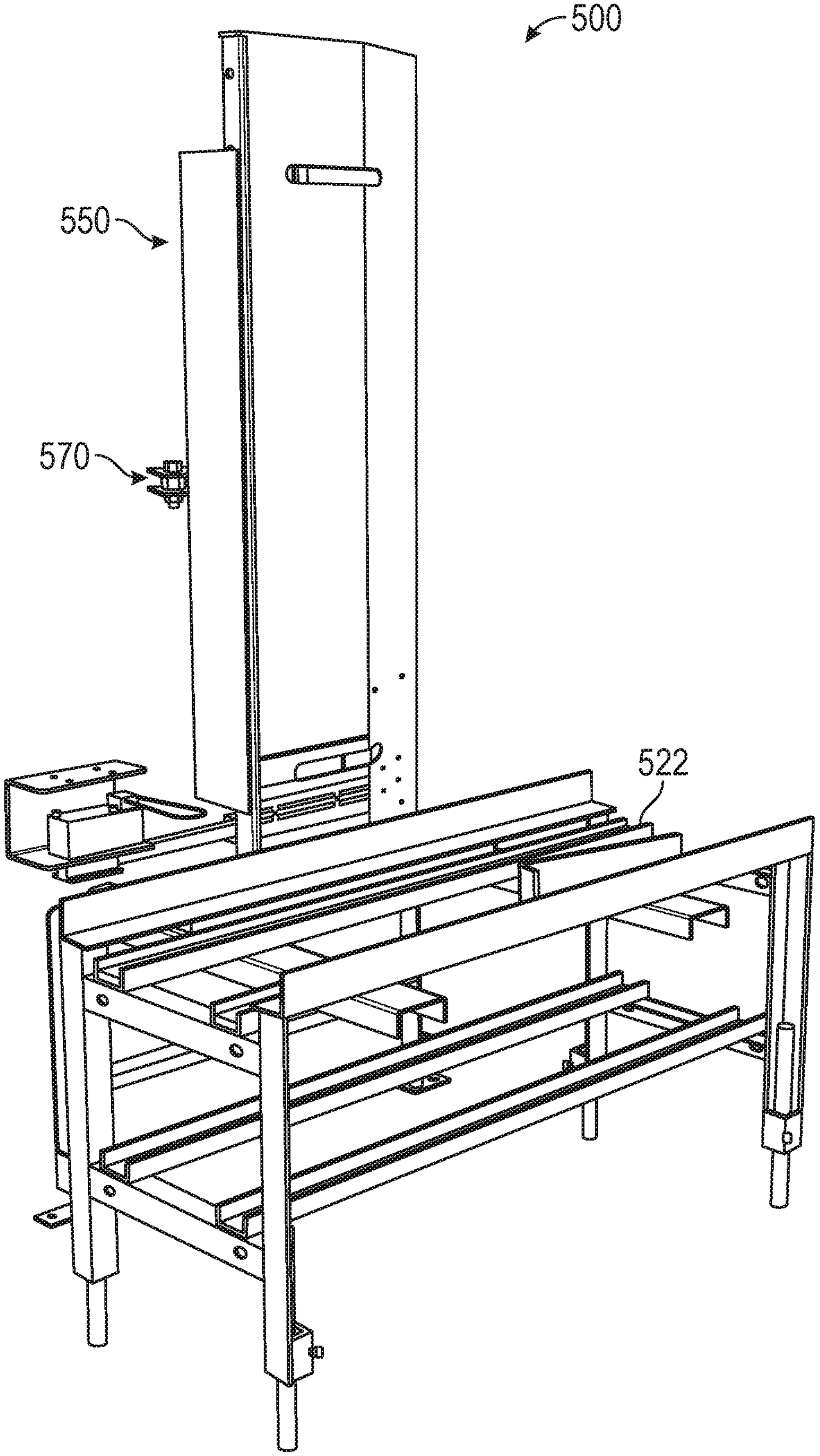
FIG. 17 illustrates a perspective view of the device of FIG. 16.
Figure 18:
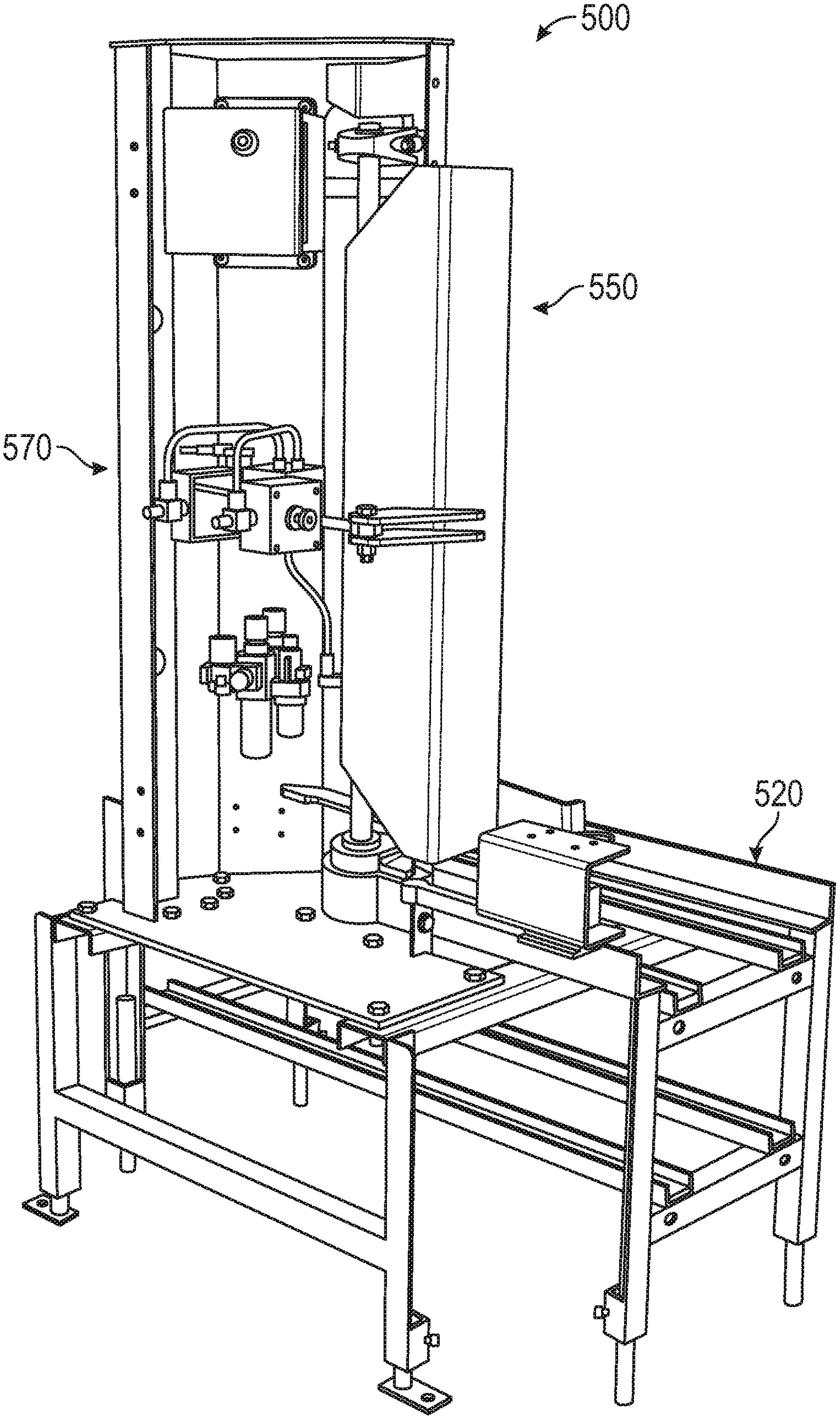
FIG. 18 illustrates a perspective view of the device of FIG. 16.

FIGS. 16-18 illustrates a perspective view of an apparatus (device) 500 capable of advancing (biasing) stack of cases into the passageway of the case unstacker and inverter of FIGS. 1-10.

The apparatus 500 is illustrated with a base 510, a first actuator 530, an arm 550 and a second actuator 570.

The base 510 is mounted for a reciprocal movement in a linear direction between a first position and a second position;

The first actuator 530 connected to the base 510 and to a first source of energy, the first actuator 530 designed to reciprocally move the base 510 in the linear direction from the first position into the second position, in a response to a receipt of a first signal, and move the base 510 from the second position into the first position in a response to a receipt of a second signal.

The arm 550 pivotally mounted on the base 510.

The second actuator 570 is connected to the arm 550 and to a second source of energy, the second actuator 570 designed to pivot the arm 550 from a third position where the arm 550 contacts the stack of cases 10 into a fourth position where the arm 550 is disposed adjacent to the stack of cases 10 in a response to a receipt of a third signal and pivot the arm 550 from the fourth position into the third position in a response to a receipt of a fourth signal.

FIGS. 17-18 also illustrate mounting components 520 with conveyor tracks 522 design to support the conveyor chain (not shown).

Thus, in view of the above, the devices 400 and 500 of FIGS. 11-18 provide the means for biasing the stack of articles into the hollow interior or the passageway of the guide.

Figure 19:
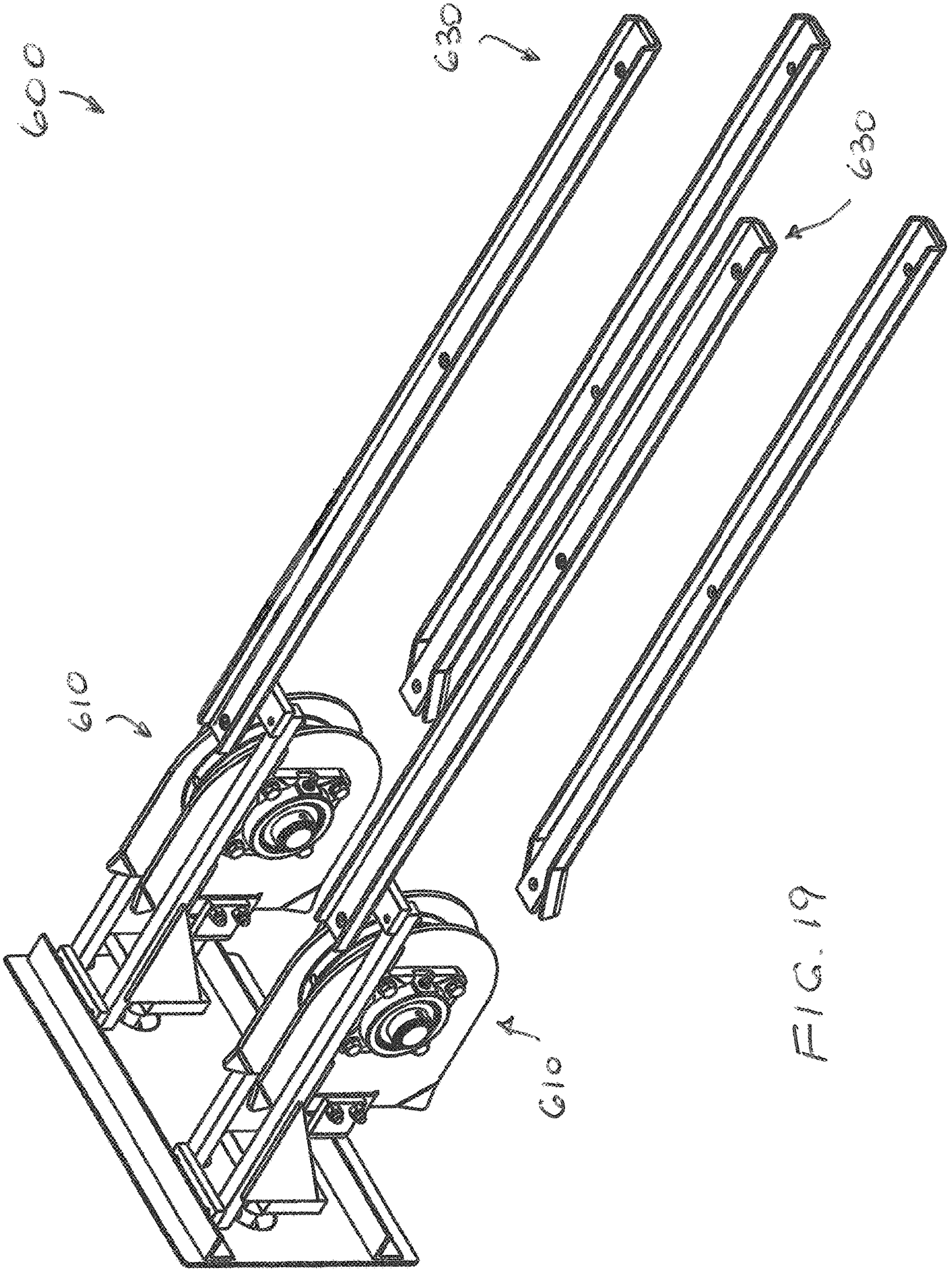
FIG. 19 illustrates a perspective view of a device capable of aiding in removal of trash from inverted cases.

FIG. 19 illustrates a perspective view of an apparatus (device) 600 capable of aiding in removal of trash (expulsion of foreign objects present within a case 10) from inverted cases 10. This apparatus 600 is mounted adjacent the outlet end of the guide 30 to receive cases 10 that invert upon contact with the curved portion 49.

The apparatus 600 is illustrated with two pulleys 610 and two conveyor tracks 630.

Figure 20:
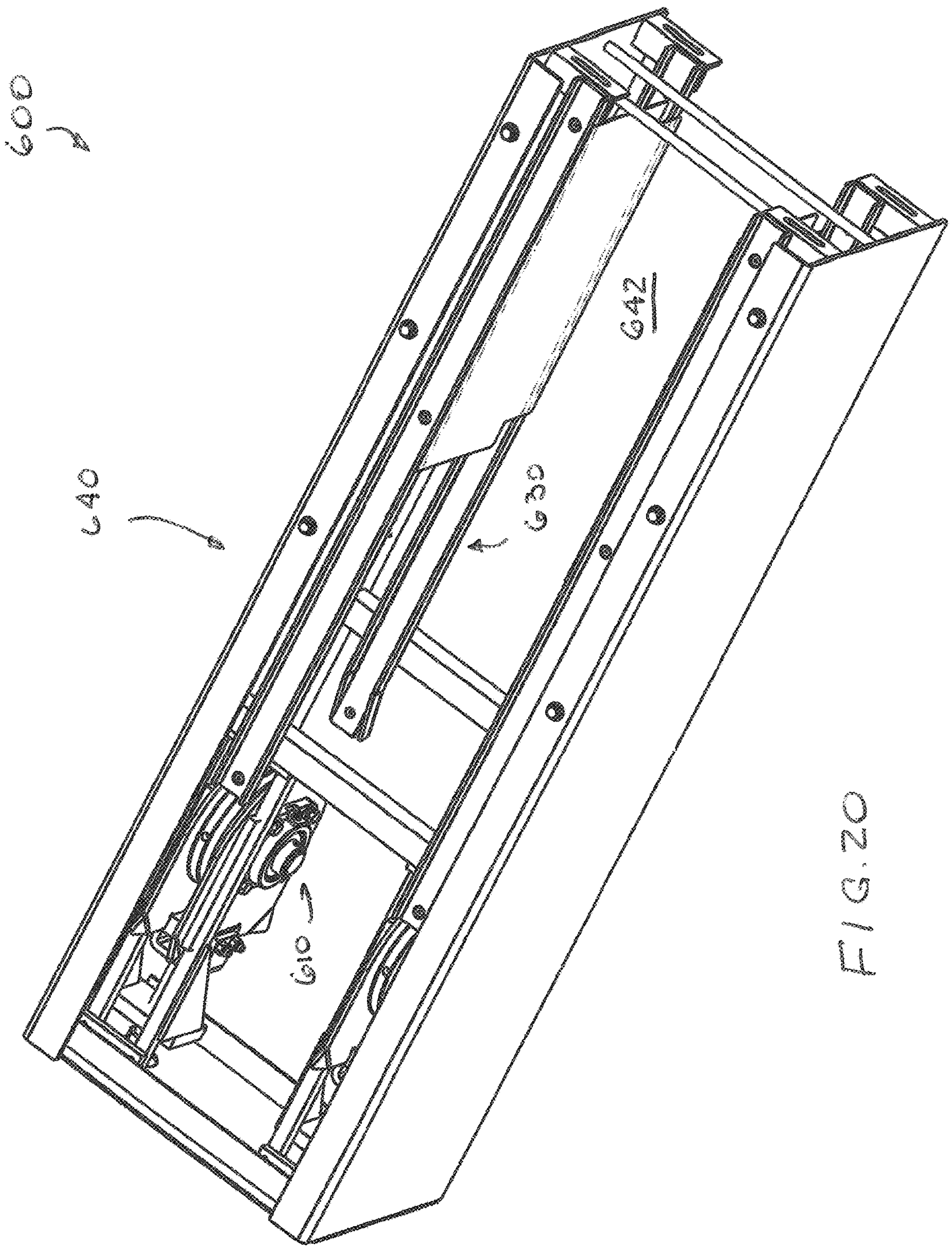
FIG. 20 illustrates a perspective view of the device of FIG. 19.

FIG. 20 illustrates a perspective view of the apparatus 600 of FIG. 19 and further illustrates a housing 640. The pulleys 610 are mounted for a rotation within a hollow interior 642 of the housing 640. The two conveyor tracks 630 are also mounted within the hollow interior 642 of the housing 640, each conveyor track 630 is aligned with a respective pulley 610.

Figure 21:
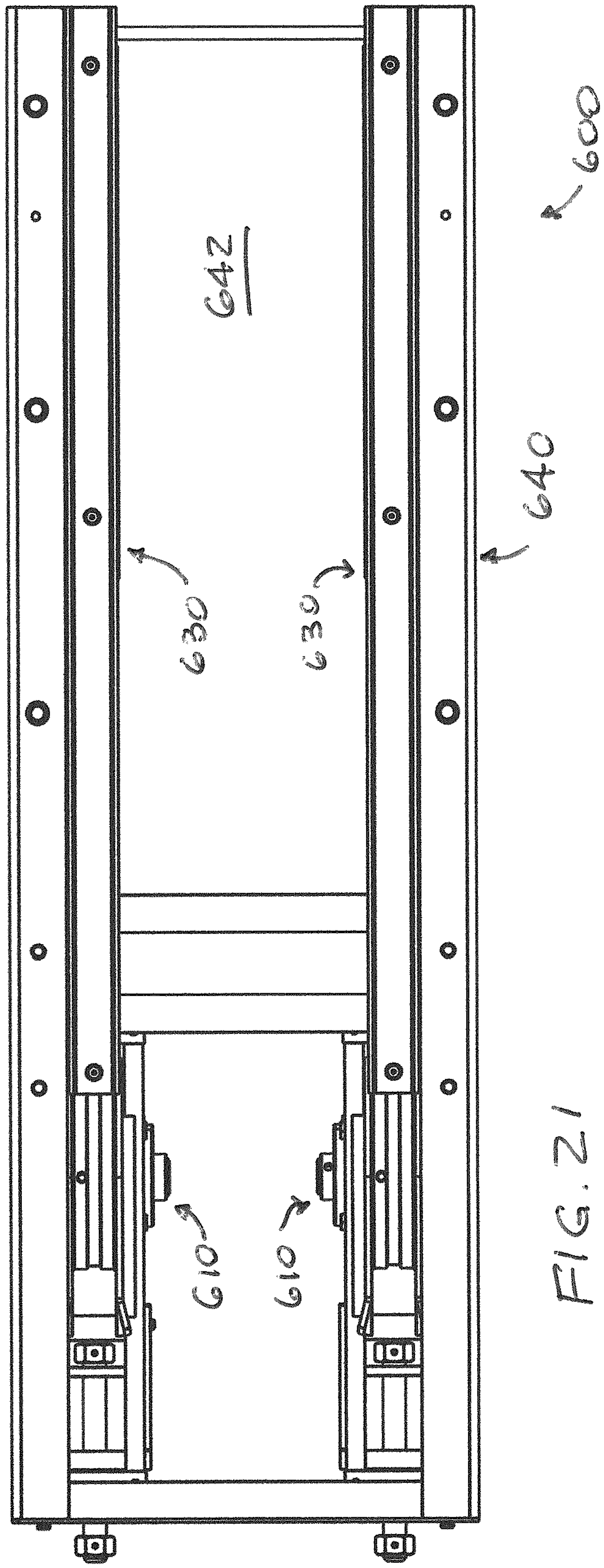
FIG. 21 illustrates a planar view of the device of FIG. 20.

FIG. 21 illustrates a planar view of the apparatus 600 of FIG. 20.

Figure 22:
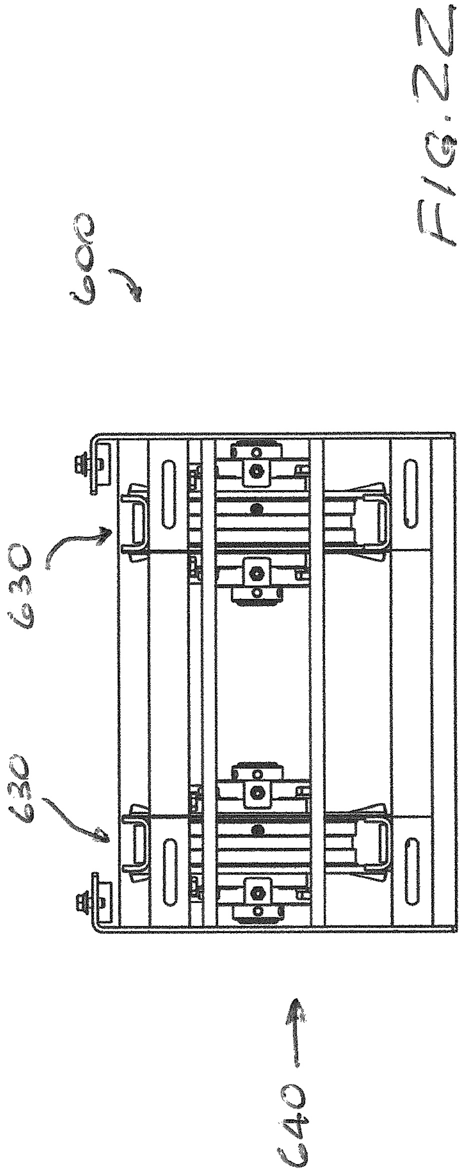
FIG. 22 illustrates an elevation view of the device of FIG. 20.

FIG. 22 illustrates an elevation view of the apparatus 600 of FIG. 20.

Figure 23:
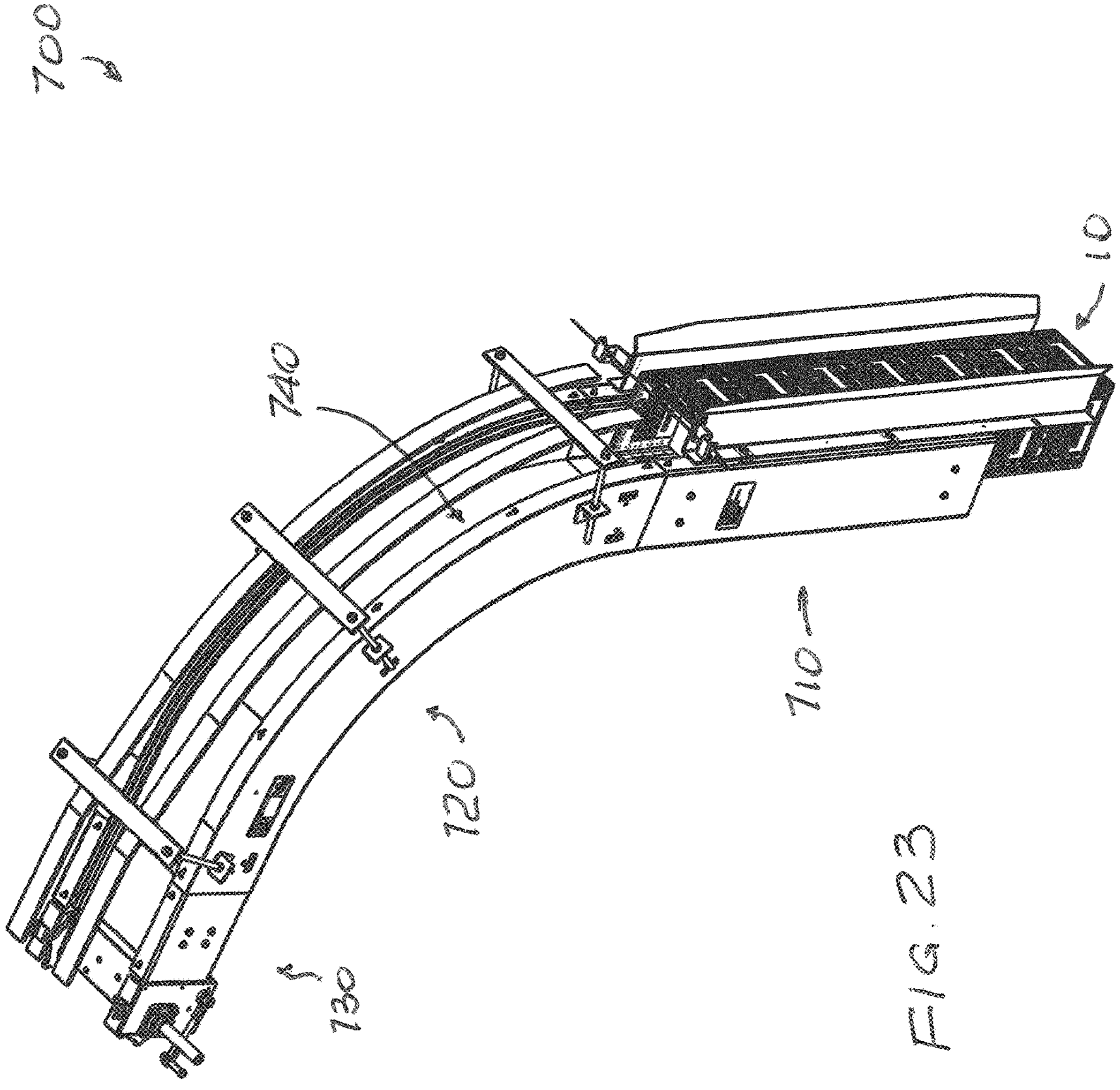
FIG. 23 illustrates a perspective view of a case unstacker and inverter.

FIG. 23 illustrates a perspective view of a case unstacker and inverter 700 with a first straight section 710, a curved section 720 and a second straight section 730, defining, in a combination with each other, a passageway 740.

Figure 24:
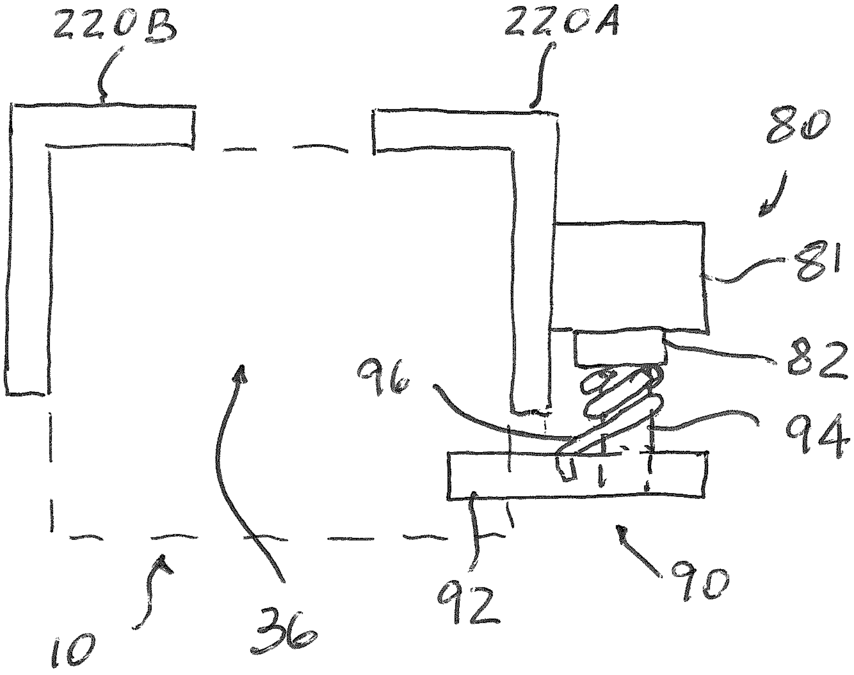
FIG. 24 illustrates a diagrammatic view of an actuator with a lifting component mounted on an exterior surface of a guide.

FIG. 24 illustrates a diagrammatic view where the rodless cylinder 80 with a body 81 and the carriage 82 is mounted on an exterior surface a side 220A of the guide. The arm 90 is pivotally mounted on a shaft 94 so that its portion 82 protrudes into the hollow interior 36. A bias spring 96, for example of a torsion type, is illustrated to bias the arm 90 into protrusion into the hollow interior 36. The side 220A does not need an elongated aperture 232 of FIG. 6. The side 220A may be also used to mount a second rodless cylinder, if required.

Figure 25:
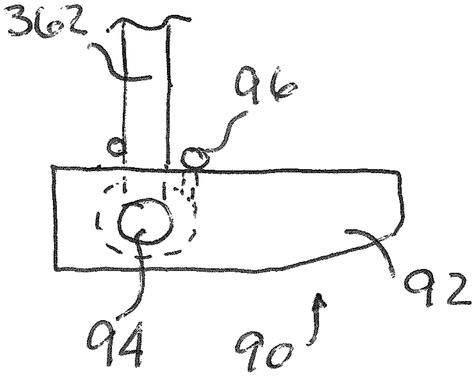
FIG. 25 illustrates an elevation diagrammatic view of a lifting component mounted on an end of a cylinder rod.

FIG. 25 illustrates a diagrammatic view where the arm 90 is pivotally mounted on the shaft 94 that is attached to a rod 362 of the cylinder 360 of FIGS. 8-9. A bias spring 96, for example of a torsion type, is illustrated to bias the arm 90 into protrusion into the hollow interior 36 (not shown in FIF. 26A).

Figure 26:
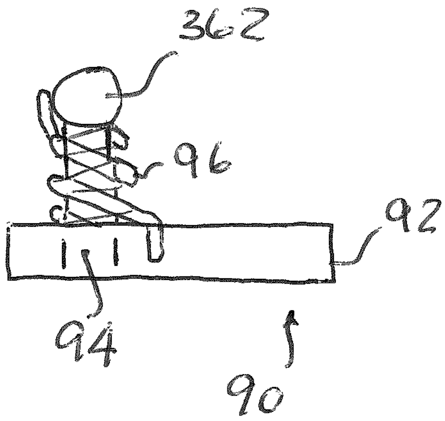
FIG. 26 illustrates a top diagram view of the arm of FIG. 26A.

FIG. 26 illustrates a top view of the arm 90 and rod 263 of FIG. 25.

Figure 27:
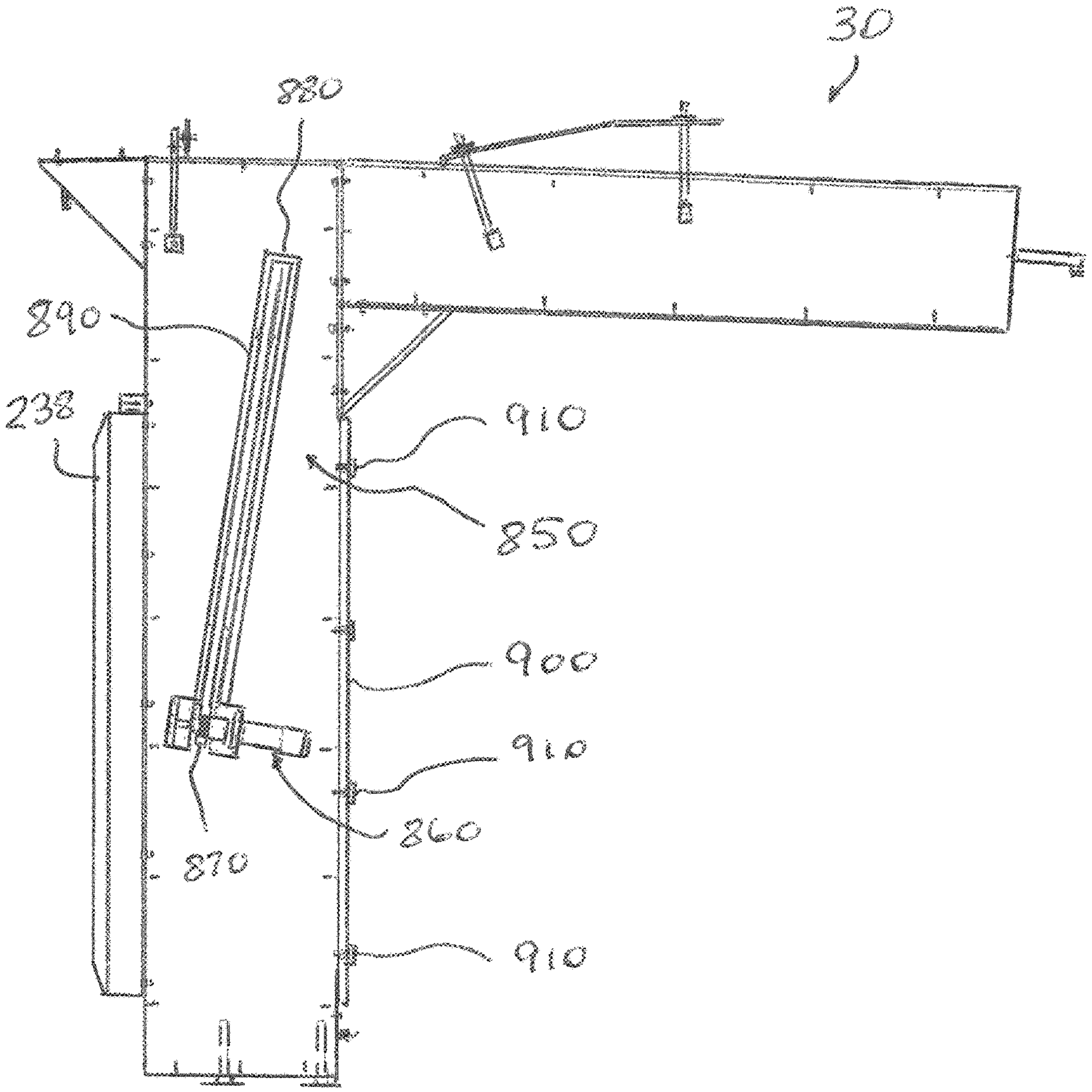
FIG. 27 illustrates an elevation view of a case unstacker and inverter.

FIG. 27 illustrates an elevation view of a device 850 capable of moving a lifting component. The device 850 is illustrated with a servo motor 860, as an actuator, and a pulley 870 coupled to an output component of the servo motor 860. An endless component 890, for example such as a belt, engages the pulley 870 and another pulley 880. The endless component 890 provides a portion that is reciprocally moved by the servo motor (actuator) 890 in a response to at least one control signal. The at least one control signal may be a signal to start rotation in a first direction. Two control signals may be used. One control signal to start rotation and the second control signal is to reverse direction. Rotation of the servo motor in either direction may be stopped in a response to one or both controls signal being discontinued. The lifting component is not illustrated in FIG. 27 but may be any of the lifting components, as described above. It will be understood that the lifting component attaches to the endless component 890. In an example, the bracket 112 may be attached to the endless component 890. The bracket 112 may be crimped onto the endless component 890.

It will be further understood in view of the above that the second device 850 may be mounted on an opposite side of the guide 30.

FIG. 27 also illustrates a safety door 900, as described above, that can be detachably or moveably attached to the guide 30 with one or more clasps 910. A hinge (not shown) may be used to hingeably mount the door 900 to the guide 30. Clasps 910 may be provided on two edges of the door 900 to detachably attach the door 900 to the guide 30.

Figure 28:
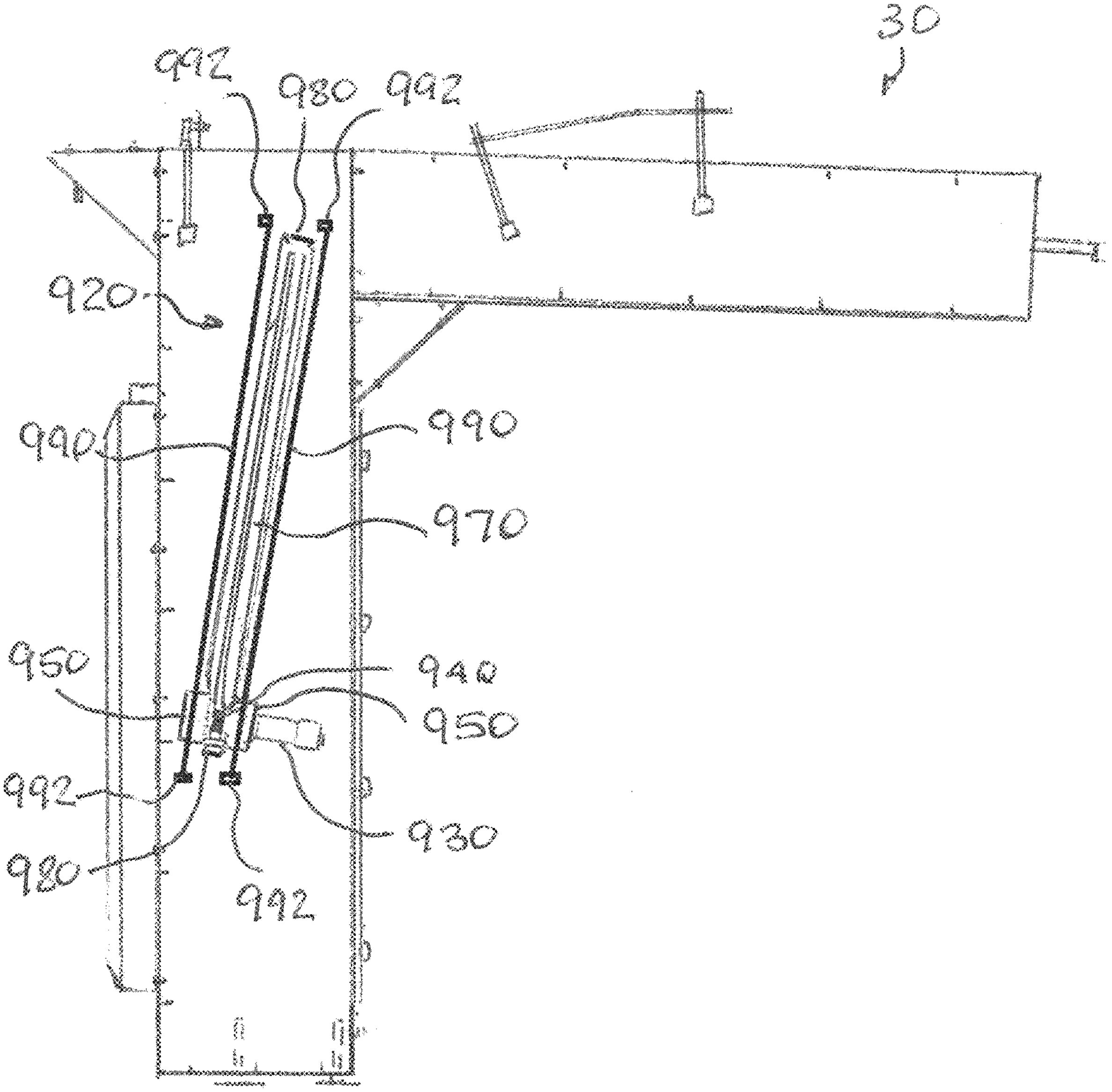
FIG. 28 illustrates an elevation view of a case unstacker and inverter.

FIG. 28 illustrates a diagrammatic view of a device 920 capable of moving a lifting component (not shown). The device 920 is illustrated as including a servo motor 930, as an actuator, with a toothed sprocket 940 coupled to an output component of the servo motor 930. The sprocket 940 engages an endless component 970 rotates due to a motion of the servo motor 930. The endless component 970, for example such as a belt, is fixed at each end 980 to the guide 30. Two linear bearing 950 are provided in an indirect connection with the endless component 970 and are configured for a linear movement on shafts or rods 990 that are fixed to the guide 30 at ends 992. The lifting component (not shown) is coupled to the endless component 970. Additional pulleys are not shown in FIG. 28 and are provided to reciprocally move the lifting component (not shown) between the ends 980 based on a direction of rotation of the toothed sprocket 34 that is in turn caused by a rotation of the output component of the servo motor 930.

The endless component 970 provides a portion that is reciprocally moved by the servo motor 930 in a response to at least one control signal. The at least one control signal may be a signal to start rotation in a first direction. Two control signals may be used. One control signal to start rotation and the second control signal is to reverse direction. Rotation of the servo motor in either direction may be stopped in a response to one or both controls signal being discontinued.

It will be further understood in view of the above that the second device 920 may be mounted on an opposite side of the guide 30.

Figure 29:
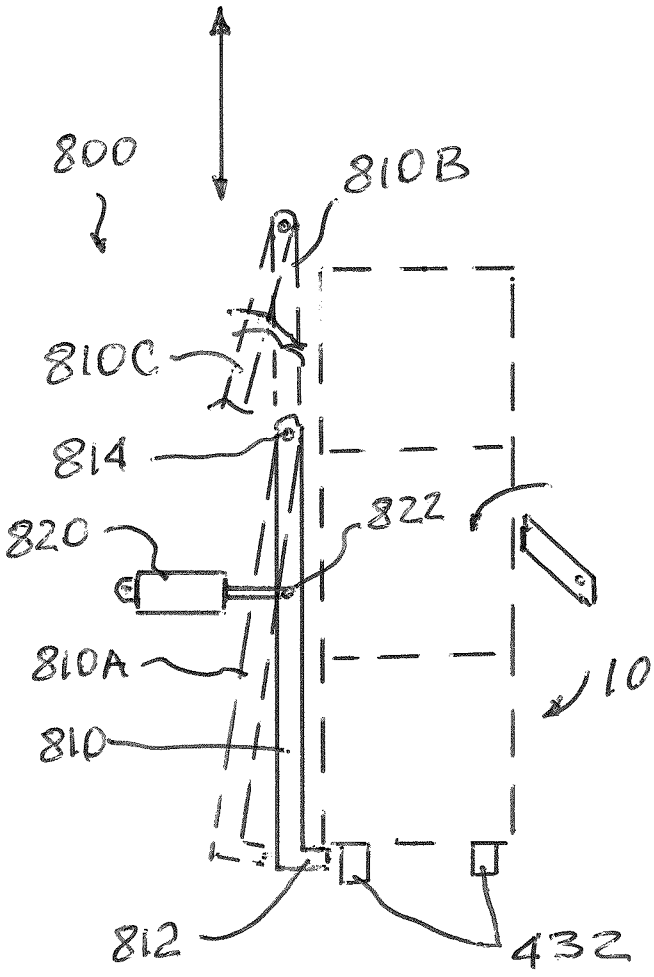
FIG. 29 illustrates a diagrammatic view of a device with a lifting component.

FIG. 29 illustrates a diagrammatic view of a device 800 with lifting component 810. The lifting component 810 includes a portion 812 designed to contact (engage) an article 10 within a stack of articles that is being advanced on the conveyor chains 432. The lifting component 810 is illustrated with a pivot connection 814. The device 800 is further illustrated with an actuator 820 having a pivotal connection 822 with the lifting component 810.

Reference numeral 810A illustrates a position of the lifting component 810 being moved by the actuator 820 to avoid contact with the article 10.

Reference numeral 810B illustrates a position of the lifting component 810 being moved by another actuator (not shown) to lift the stack of articles 10, as has been described above.

Reference numeral 810C illustrates a position of the lifting component 810 being moved by the actuator 820 to return the lifting component 810 in a downward position.

Figure 30:
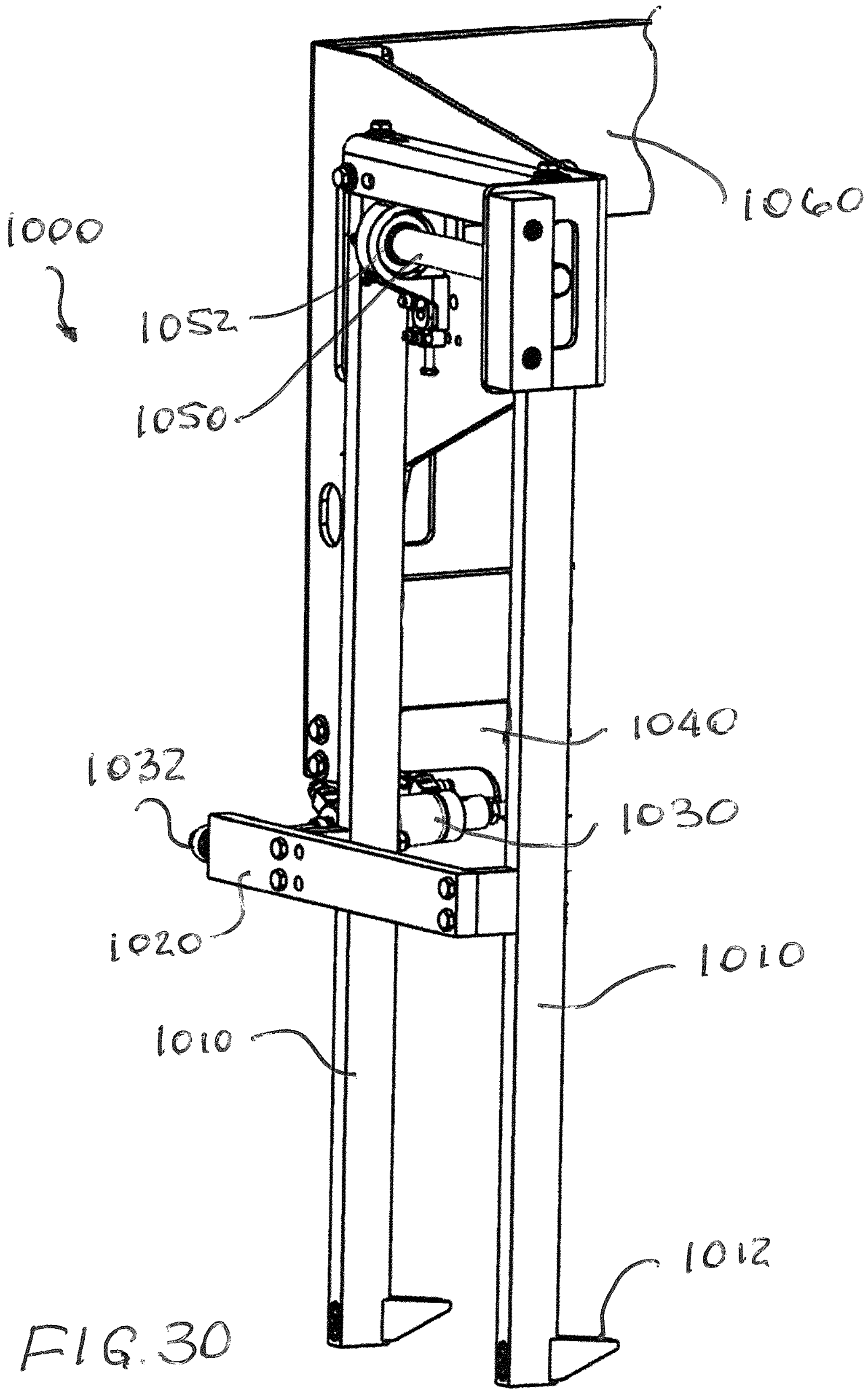
FIG. 30 illustrates a perspective view of a device with two lifting components.

FIG. 30 illustrates a perspective view of a device 1000 with two lifting components 1010. Each lifting component 1010 is illustrated with an article-engaging portion 1012 at one terminal end of the each lifting component 1010. The each lifting component 1010 may be the same as the lifting component 810, as discussed above. Lifting components 1010 are connected, mediate terminal ends thereof, to a common bracket 1020. One end of the common bracket 1020 is in a pivotal connection 1032 with an actuator 1030, that is further illustrated as a cylinder but may be any actuator, as described above, capable of providing a linear motion. The actuator 1030 is attached to a stationary portion 1040. An opposite terminal end of each lifting component 1010 is in a pivotal connection with a structure 1060. The structure 1060 may be a portion of the guide 30. This pivotal connection is illustrated as a shaft 1050 with each end connected to a respective lifting component and two bearings 1052, only one of which is illustrated in FIG. 30. The guide 30 may be adapted with two elongated apertures, for example such as above described elongated aperture 222, each elongated aperture being sized to receive a respective article-engaging portion 1012. A side of the guide 30 may be sized to fit between the lifting components 1010. The side of the guide 30 may be adapted with one elongated aperture to receive one lifting component 1010 and sized for the second lifting component 1010 to travel external to the guide 30, for example as illustrated in FIG. 24.

The article-engaging portion 1012 may be referred to as an article-contacting portion 1012.

Figure 31:
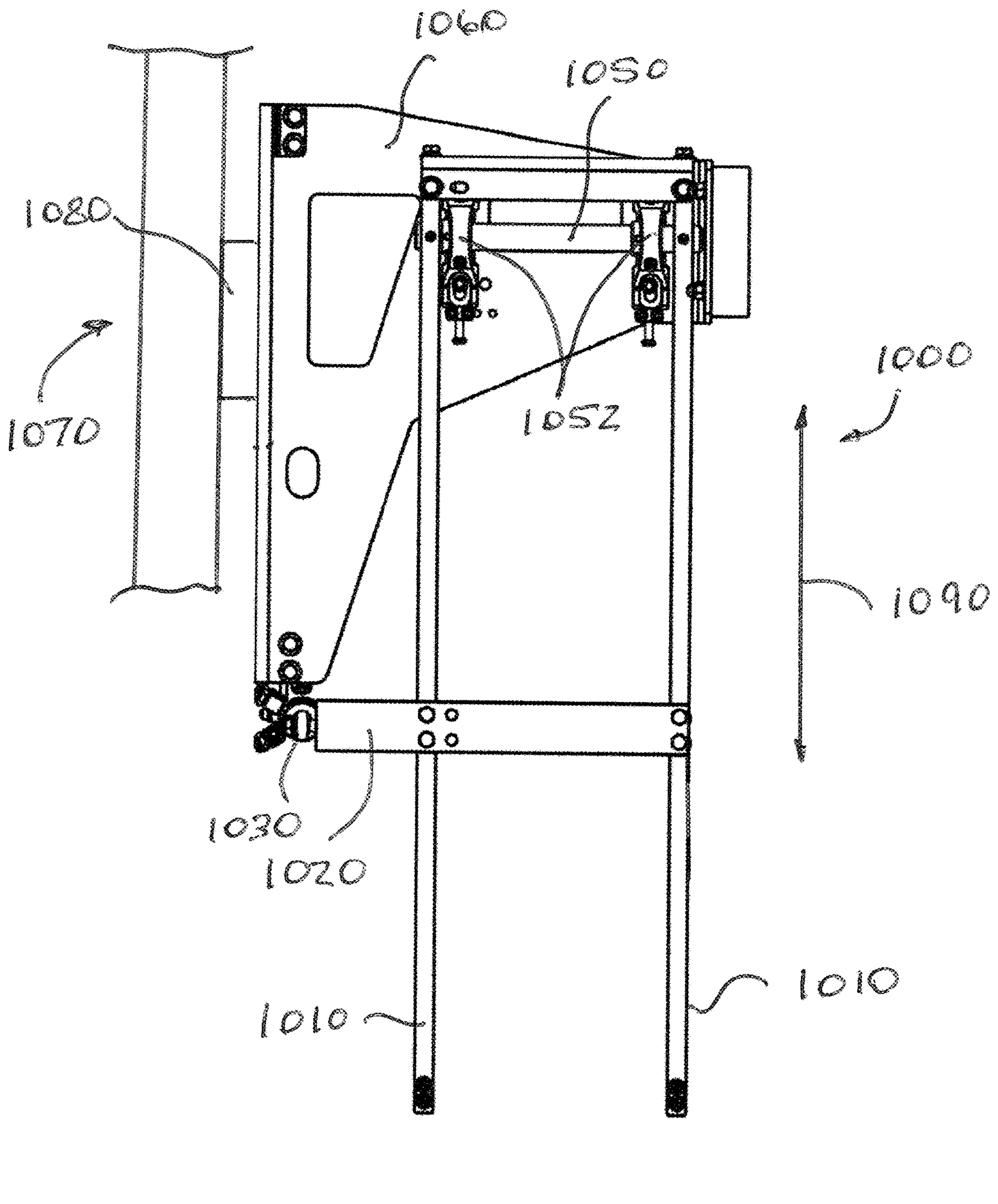
FIG. 31 illustrates an elevation view of a device with two lifting components of FIG. 30.

FIG. 31 illustrates an elevation view of the device 1000 of FIG. 30. Further illustrated is an actuator 1070 with a portion 1080 connected to the structure 1060. The actuator 1070 may be any one of the actuators, as described above. The portion 1080 is adapted to travel along a length of the actuator 1070, as described above with other actuators. This device is capable of reciprocally moving the lifting arms 1010 with the actuator 103 along a direction 1090. The direction 1090 may be a vertical direction during use of the device 1000.

Figure 32:
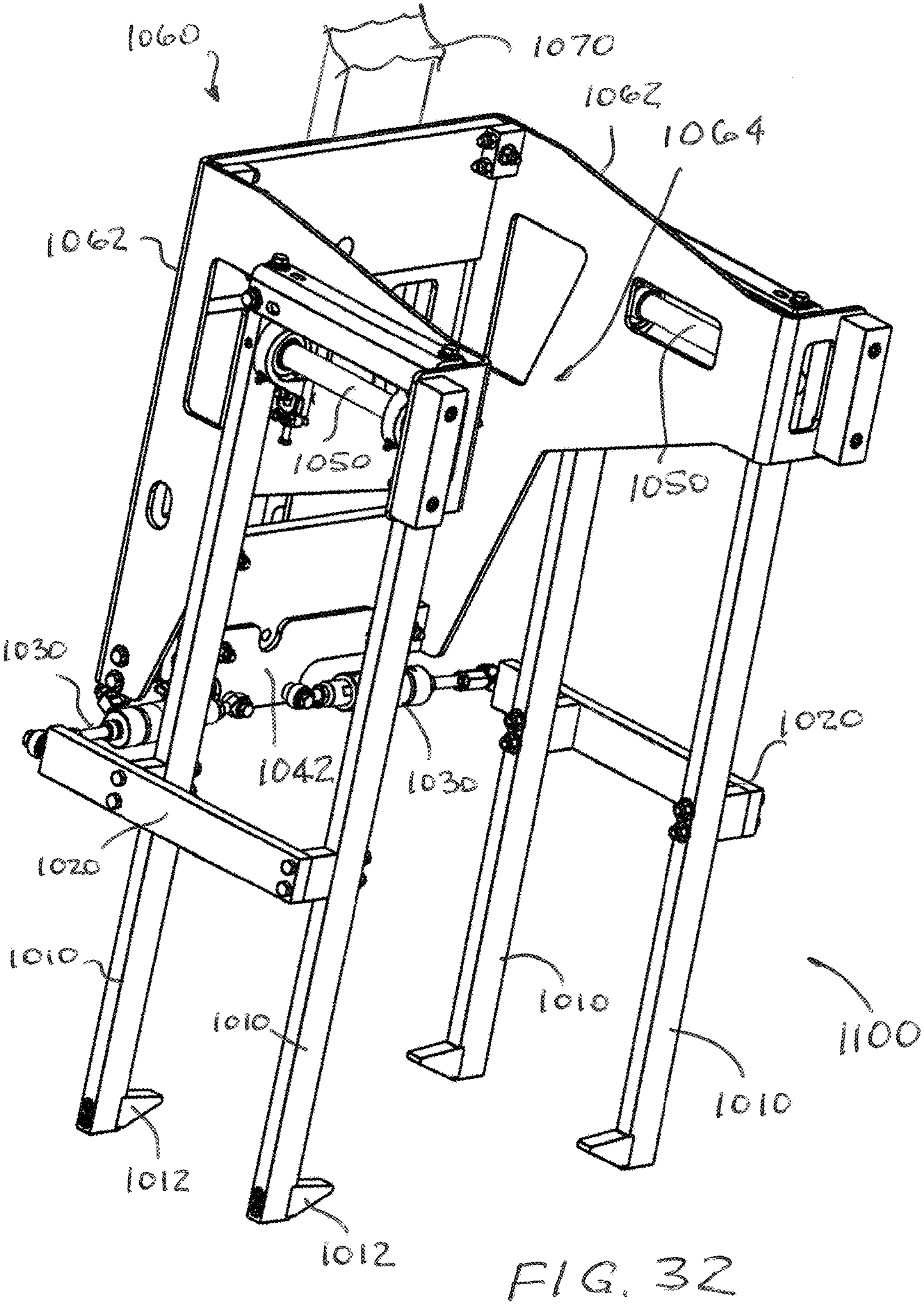
FIG. 32 illustrates a perspective view of a device with lifting components.

FIG. 32 illustrates a perspective view of a device 1100 with four lifting components 1010. The structure 1060 is illustrated as a U-shaped structure with two sides 1062 defining a hollow interior 1064. The hollow interior 1064 is being sized to receive the stack of articles 10 therewithin. The actuator 1070 is also illustrated.

When the actuator 1070 is adapted with a curve, the device 1100 is capable of moving the stack of articles 10 from a feed conveyor up to a position where each article 10 is being inverted.

Thus, the device 1100 if FIG. 32 may replace at least a portion of guide 30. In other words, the apparatus and method of unstacking and inverting cases may be provided without a stationary guide.

Figure 33:
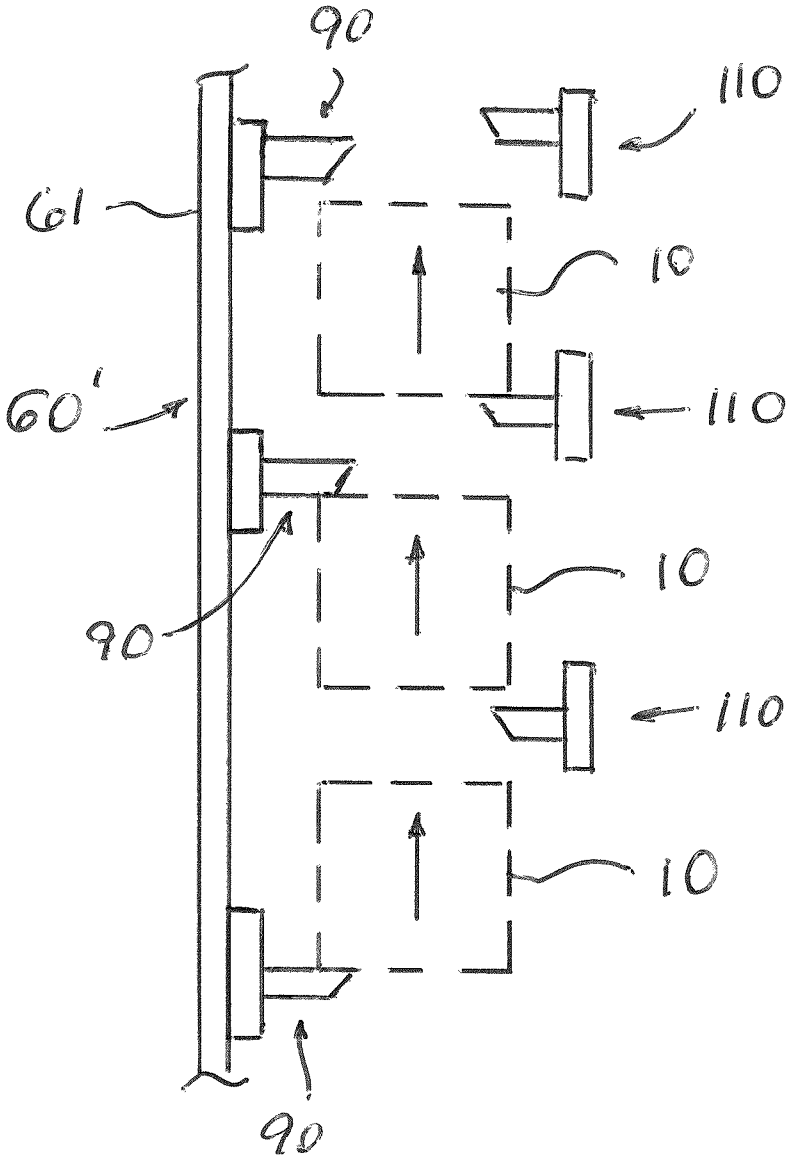
FIG. 33 illustrates a diagrammatic view of moving multiple articles with multiple lifting components.

FIG. 33 illustrates a device 60' capable of moving multiple articles 10 with multiple lifting components 90. The multiple lifting components 90 are attached to a common carrier 60' that is connected to an actuator (not shown). The actuator may be of any type, as described above. Multiple stops 110 are also illustrated. The device 60 may be capable of moving each article 10 with a separate lifting component 90. Furthermore, although stops 110 are illustrated as being disposed opposite of lifting components 90, these stops 110 may be disposed on a portion of the guide 30 that is adjacent the portion having the device 60 mounted on.

The device 60' may be of the type as disclosed in U.S. Pat. No. 10,233,027 B1 issued to McCafferty et al. on Mar. 19, 2019 and titled "Material Handling Apparatus and Method and U.S. Pat. No. 9,745,137 B1 issued to McCafferty et al. on Aug. 29, 2017 and titled "Apparatus, System And Method For Material Handling And/Or Processing".

It is to be understood that a second device 60' may replace the multiple stops 110. Then, the second device 60' will be positioned so as to engage the articles 10 that have been incrementally advanced by the first device 60'.

Embodiments

All following independent claims are contemplated to be described herein as embodiments and all dependent claims are contemplated to be described herein as features.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the Application or of any further Application(s) derived therefrom.

The chosen embodiments of the subject matter are thus being described and illustrated, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded and rounded angles may be sharp. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described embodiments may be made by those skilled in the art without departing from the spirit and scope of the invention as set forth in the appended claims. In one non-limiting example, while many figures illustrate various components being joined into assembly or assemblies by fasteners, other techniques, such as welding and use of adhesives, may be employed. In another non-limiting example, while many figures illustrate components manufactured from sheet metal or plate metal, components manufactured by molding, casting or using tubular shapes may be employed.

It should be appreciated that reference throughout this specification to "an embodiment" means that a particular feature, structure or characteristic described in connection with the embodiment is included in at least one embodiment of the disclosed subject matter. The particular features, structures or characteristics may be combined as suitable in one or more embodiments of the disclosed subject matter. Each embodiment may be employed alone or in any combination, and may include any one or more of the above features in any suitable combination.

Anywhere the term "comprising" is used, embodiments and components "consisting essentially of" and "consisting of" are expressly disclosed and described herein."

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

The Abstract is not intended to be limiting as to the scope of the claimed subject matter and is for the purpose of quickly determining the nature of the claimed subject matter.

What is claimed is:

1. A device, comprising:

at least one lifting component;

an actuator configured to reciprocally and linearly move the at least one lifting component along first and second directions; and a pivotal connection between the at least one lifting component and the actuator, the at least one lifting component being pivotally movable between a first position and a second position being generally perpendicular to the first position;

a bias component designed to bias the least one lifting component into one position from first and second positions;

the device being capable of moving, with the at least one lifting component, a stack of articles at least along a first direction.

2. The device of claim 1, wherein the actuator comprises a rodless cylinder with a carriage adapted for a reciprocal movement in a response to a supply of fluid to the rodless cylinder and wherein the pivotal connection being between the carriage and the at least one lifting component.

3. The device of claim 1, wherein the actuator comprises a servo motor with a belt.

4. The device of claim 1, further comprising another actuator capable of moving the at least one lifting component to avoid contact with an article within the stack of articles.

5. The device of claim 1, further comprising a guide, adapted to at least receive a stack of articles within a hollow interior thereof, wherein the actuator being connected to the guide.

6. The device of claim 1, further comprising a component, the component including at least one straight section, at least one curved section and a passageway through the at least one straight section and the at least one curved section, and wherein the actuator including a portion being attached to the component.

7. An apparatus, comprising:

a component including at least one straight section, a curved section and a passageway, the passageway being sized and shaped to receive a stack of articles therewithin; and at least one device capable of moving the stack of articles within the passageway along a first direction, the at least one device including:

an actuator attached to the component, the actuator at least including a portion adapted for a reciprocal movement along first and second directions, an arm pivotally attached to the portion for a movement between a first position where an arm portion protrudes into the passageway and a second position where the arm portion is external to the passageway, and a bias component designed to bias the arm into the first position.

8. The apparatus of claim 7, further comprising a stop designed to prevent a movement of the stack, advanced by the at least one device, in a second direction, the second direction being opposite to the first direction.

9. The apparatus of claim 7, further comprising:

a housing attached to the portion for a movement along first and second directions; and a pivot mounted within a hollow interior of the housing.

10. The apparatus of claim 7, further comprising an elongated slot through a thickness of a wall in the at least one straight section, the elongated slot extending at least along the first direction, and wherein the arm is disposed to move between the first and second directions within the elongated slot.

11. The apparatus of claim 7, further comprising a retainer designed to prevent unintended exit of the stack from the passageway and mediate ends of the component.

12. An apparatus, comprising:

a guide with an inlet end, an outlet end and a hollow interior between inlet and outlet ends, the hollow interior sized and shaped to at least receive a stack of articles therewithin; and a conveyance means for conveying the stack, the conveyance means at least including:

at least one actuator attached to the guide, the at least one actuator at least including a portion adapted for a reciprocal movement along first and second directions, an arm pivotally attached to the portion for a pivotal movement between a first position where at least an arm portion protrudes into the hollow interior and a second position where the arm portion is external to the hollow interior, and a bias component designed to bias the arm into the first position.

13. The apparatus of claim 12, wherein the guide comprises two elongated components being spaced from each other along a width of the guide, each elongated component from two elongated components at least includes a straight portion.

14. The apparatus of claim 13, further comprising a means for biasing the stack into the hollow interior.

15. The apparatus of claim 14, wherein the means for biasing the stack comprises:

a frame;

a conveyor attached to the frame;

a first component attached to the frame;

a second component attached to the frame opposite to the first component; and an actuator capable of moving first and second components between a first position and a second position in a response to a receipt of a control signal.

16. The apparatus of claim 13, further comprising at least one sensor positioned to sense one of a presence and an absence of the stack within the hollow interior.

17. The apparatus of claim 13, wherein the guide comprises two elongated components being spaced from each other along a width of the guide, each elongated component from two elongated components includes at least a straight portion and a curved portion.

18. The apparatus of claim 17, wherein the guide further comprises two additional components, elongated each additional elongated component from the two additional elongated components being aligned with and disposed at a distance from a respective elongated component from the two elongated components, the distance sized sufficiently to allow passage of cases through the hollow interior.

19. The apparatus of claim 13, further comprising a device capable of aiding in a removal of foreign objects present within an article discharged at the outlet end of the guide, the device at least including two pulleys with two conveyor tracks.

20. The apparatus of claim 13, further comprising a device capable of aiding in a removal of foreign objects present within an article discharged at the outlet end of the guide, the device at least including two pulleys with two conveyor tracks.

21. An apparatus, comprising:

a component including at least one straight section, a curved section and a passageway, the passageway being sized and shaped to receive a stack of articles therewithin; and at least one device capable of moving the stack of articles within the passageway along a first direction, the at least one device including:

an actuator attached to the component, the actuator includes at least a body and a portion moveable along first and second directions, a housing attached to the portion for a movement along the first and second directions, a pivot mounted within a hollow interior of the housing;

an actuator attached to the pivot and to a source of power, and an arm attached to the pivot and pivotally movable by a powered actuator between a first position where an arm portion protrudes into the passageway and a second position where the arm portion is external to the passageway.

22. The apparatus of claim 21, wherein the at least one device comprises:

a drive with an output shaft;

a driving pulley attached to the output shaft;

a driven pulley disposed at a distance from the driving pulley along the first direction; and an endless member caging driving and driven pulleys;

an arm being attached to the endless member.

23. An apparatus, comprising:

a component including at least one straight section, a curved section and a passageway, the passageway being sized and shaped to receive a stack of articles therewithin;

at least one device capable of moving the stack of articles within the passageway along a first direction; and a stop designed to prevent a movement of the stack, advanced by the at least one device, in a second direction, the second direction being opposite to the first direction.

24. An apparatus, comprising:

a guide with an inlet end, an outlet end and a hollow interior between inlet and outlet ends, the hollow interior sized and shaped to at least receive a stack of articles therewithin; and a conveyance means for conveying the stack, the conveyance means at least including:

a first device on one side of the guide;

a second device on an opposite side of the guide, a first arm pivotally connected to a reciprocally moving component on the first device for a reciprocal movement in a linear direction and for pivoting between an article-engaging position and an article-disengaging position, a second arm pivotally connected to a reciprocally moving component on the second device for a reciprocal movement in the linear direction and for pivoting between the article-engaging position and the article-disengaging position, and a third arm pivotally mounted to one of one and another sides of the guide, the third arm being disposed mediate terminal positions of first and second arms, the third arm pivots between the article-engaging position and the article-disengaging position, wherein in the article-engaging position at least a portion of each arm from first, second and third arms being biased for protrusion into the hollow interior, wherein at least a portion of the each arm from first, second and third arms clears, in the article article-disengaging position, the hollow interior.

* * * * *